(12) United States Patent
Lim et al.

(10) Patent No.: US 11,438,621 B2
(45) Date of Patent: Sep. 6, 2022

(54) ENCODER, DECODER, ENCODING METHOD, AND DECODING METHOD

(71) Applicant: Panasonic Intellectual Property Corporation of America, Torrance, CA (US)

(72) Inventors: Chong Soon Lim, Singapore (SG); Hai Wei Sun, Singapore (SG); Sughosh Pavan Shashidhar, Singapore (SG); Han Boon Teo, Singapore (SG); Ru Ling Liao, Singapore (SG); Jing Ya Li, Singapore (SG); Tadamasa Toma, Osaka (JP); Takahiro Nishi, Nara (JP); Kiyofumi Abe, Osaka (JP); Ryuichi Kanoh, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/087,904

(22) Filed: Nov. 3, 2020

(65) Prior Publication Data
US 2021/0136402 A1    May 6, 2021

Related U.S. Application Data

(63) Continuation of application No. PCT/JP2019/019072, filed on May 14, 2019.
(Continued)

(51) Int. Cl.
*H04N 19/52* (2014.01)

(52) U.S. Cl.
CPC .................. *H04N 19/52* (2014.11)

(58) Field of Classification Search
None
See application file for complete search history.

(56) References Cited

U.S. PATENT DOCUMENTS

| | | | |
|---|---|---|---|
| 2014/0205014 A1* | 7/2014 | Nakamura | H04N 19/577 375/240.16 |
| 2019/0182491 A1 | 6/2019 | Lee | |
| 2019/0208201 A1* | 7/2019 | Yasugi | H04N 19/159 |

FOREIGN PATENT DOCUMENTS

KR    10-2018-0015599    2/2018

OTHER PUBLICATIONS

Toma, Tadamasa et al., "Description of SDR video coding technology proposal by Panasonic", Joint Video Experts Team (JVET) of ITU-T SG 16 WP 3 and ISO/IEC JTC 1/SC 29/WG 11 10th Meeting, Apr. 10-20, 2018, pp. 1-5.
(Continued)

*Primary Examiner* — Lindsay J Uhl
(74) *Attorney, Agent, or Firm* — Wenderoth, Lind & Ponack, L.L.P.

(57) ABSTRACT

An encoder which includes circuitry and memory. Using the memory, the circuitry generates a list which includes candidates for a first motion vector for a first partition. The list has a maximum list size and an order of the candidates, and at least one of the maximum list size or the order of the candidates is dependent on at least one of a partition size or a partition shape of the first partition. The circuitry selects the first motion vector from the candidates included in the list; encodes an index indicating the first motion vector among the candidates in the list into the bitstream based on the maximum list size; and generates the predicted image for the first partition using the first motion vector.

2 Claims, 36 Drawing Sheets

(a)

RECTANGLAR PARTITION

MAXIMUM NUMBER OF MOTION VECTOR CANDIDATES = 8

(b)

TRIANGLAR PARTITION

MAXIMUM NUMBER OF MOTION VECTOR CANDIDATES = 6

Related U.S. Application Data

(60) Provisional application No. 62/672,801, filed on May 17, 2018.

(56) References Cited

OTHER PUBLICATIONS

International Search Report (ISR) dated Jul. 30, 2019 in International (PCT) Application No. PCT/JP2019/019072.
H.265 (ISO/IEC 23008-2 High efficiency video coding (HEVC)), Dec. 1, 2013.
Jian-Liang Lin, et al., "CE13: Results of tests 2d and 2e in section 3.1 on adaptive MVP list size", Joint Collaborative Team on Video Coding (JCT-VC) of ITU-T SG16 WP3 and ISO/IEC JTC1/SC29/WG11, Document: JCTVC-G232, Nov. 2011.
Chui Keun Kim, et al., "Non-CE9: reordering of merge candidate", Joint Collaborative Team on Video Coding (JCT-VC) of ITU-T SG16 WP3 and ISO/IEC JTC1/SC29/WG11, Document: JCTVC-G396, Nov. 2011.

\* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ <br> WHERE $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$ <br> WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

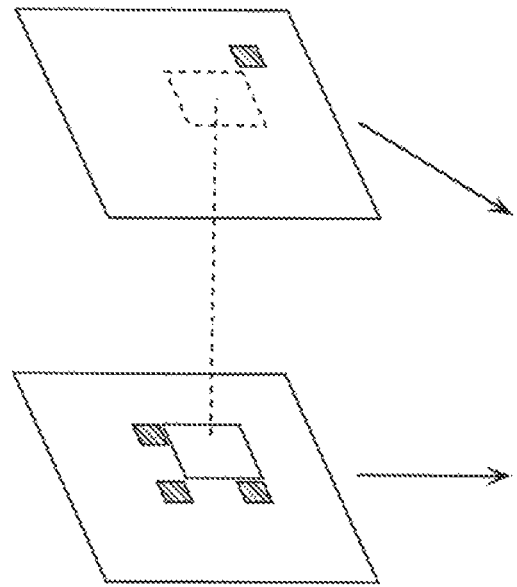

ENCODER, DECODER, ENCODING METHOD, AND DECODING METHOD

CROSS REFERENCE TO RELATED APPLICATIONS

This application is a U.S. continuation application of PCT International Patent Application Number PCT/JP2019/019072 filed on May 14, 2019, claiming the benefit of priority of U.S. Provisional Patent Application No. 62/672,801 filed on May 17, 2018, the entire contents of which are hereby incorporated by reference.

BACKGROUND

1. Technical Field

The present disclosure relates to an encoder, etc. for encoding a video into a bitstream using a predicted image.

2. Description of the Related Art

Conventionally, there has been H. 265 also referred to as (ISO/IEC 23008-2 HEVC)/HEVC (High Efficiency Video Coding) as a standard for encoding a video.

SUMMARY

An encoder according to an aspect of the present disclosure is an encoder which encodes a video into a bitstream using a predicted image, and which includes circuitry and memory. Using the memory, the circuitry generates a list which includes a plurality of candidates for a first motion vector for a first partition in the video, and in which the plurality of candidates includes a candidate which is derived from a second motion vector of a second partition different from the first partition in the video. The list has a maximum list size and an order of the plurality of candidates, and at least one of the maximum list size or the order of the plurality of candidates is dependent on at least one of a partition size or a partition shape of the first partition. Using the memory the circuitry: selects the first motion vector from the plurality of candidates included in the list; encodes an index indicating the first motion vector among the plurality of candidates in the list into the bitstream based on the maximum list size; and generates the predicted image for the first partition using the first motion vector.

It is to be noted that these general or specific aspects may be implemented using a system, an apparatus, a method, an integrated circuit, a computer program, or a non-transitory computer-readable recording medium such as a CD-ROM, or any combination of systems, apparatuses, methods, integrated circuits, computer programs, or computer-readable recording media.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type;

FIG. 9B is for illustrating an outline of a process for deriving a motion vector via merge mode;

Figure 1:
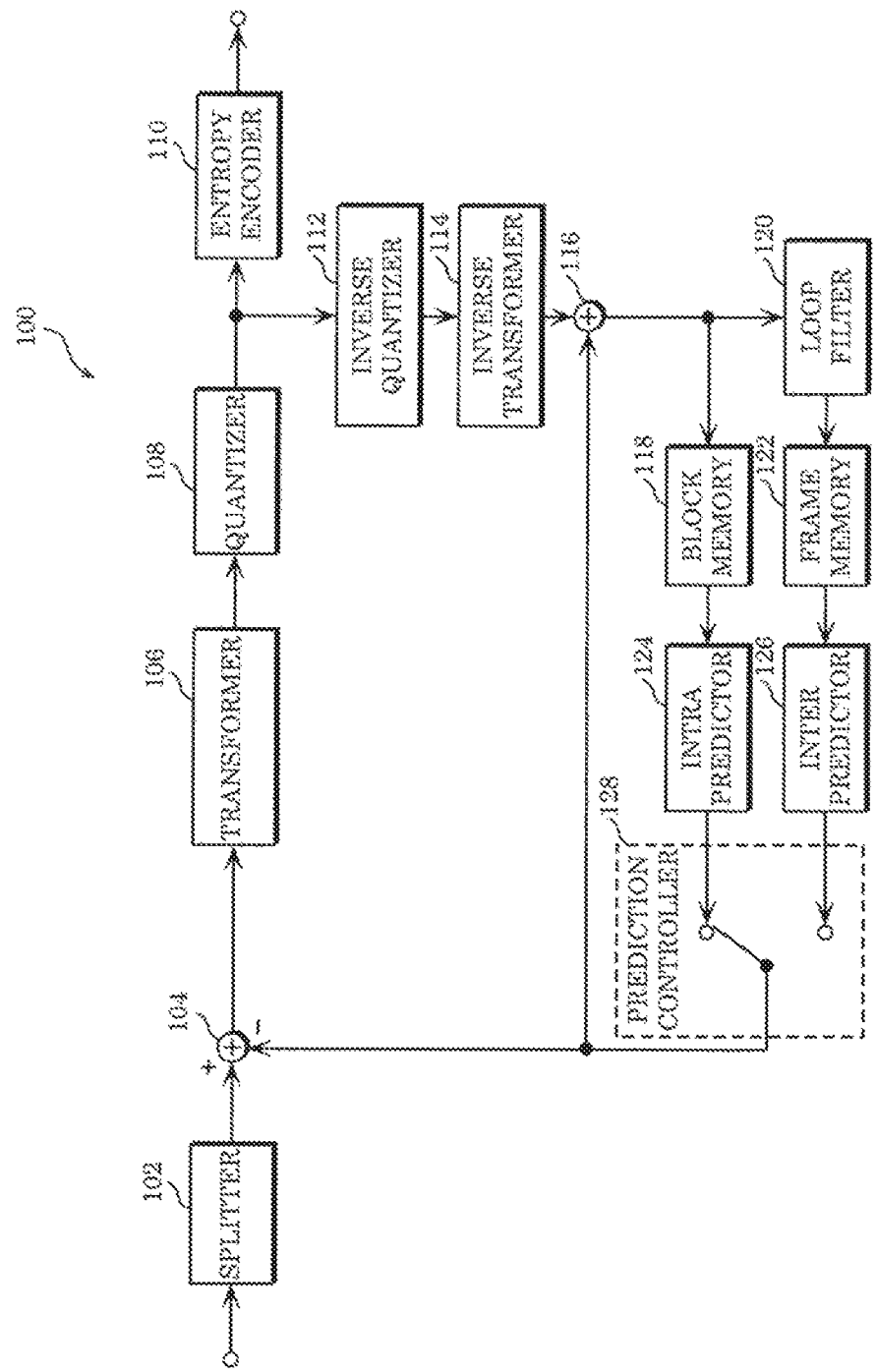
FIG. 1 is a block diagram illustrating a functional configuration of an encoder according to Embodiment 1.

DETAILED DESCRIPTION OF THE EMBODIMENTS (Underlying Knowledge Forming Basis of the Present Disclosure)

For example, an encoder encodes a video block by block. The encoder may use inter prediction or intra prediction when encoding the video block by block. When using inter prediction to encode a current block to be processed, the encoder identifies a reference block and generates a predicted image of the current block by referring to a reference block. The encoder then encodes a difference image between the predicted image of the current block and the original image of the current block, thereby reducing the code amount.

In addition, a decoder decodes a difference image when decoding a video. The decoder then generates a predicted image of a current block to be processed by referring to a reference block and adds the predicted image and the difference image to reconstruct the original image. In this way, the decoder is capable of decoding the video.

In addition, for example, the encoder and the decoder generate a motion vector candidate list for the current block using a common method, and select a motion vector for the current block from the motion vector candidate list. The encoder and the decoder then generate a predicted value of the current block using the motion vector for the current block.

In addition, the encoder encodes an index indicating the motion vector for the current block in the motion vector candidate list for the current block. In addition, the decoder decodes an index indicating the motion vector for the current block in the motion vector candidate list for the current block.

In this way, the encoder and the decoder are capable of selecting the same motion vector from the motion vector candidate list generated using the common method, and generating the same predicted image using the same motion vector. The encoder and the decoder are then capable of encoding and decoding the video appropriately using the same predicted image.

However, if information for prediction is not configured appropriately, the code amount may increase.

For example, the code amount of an index indicating a motion vector for a current block to be processed in a motion vector candidate list is dependent on a maximum list size of the motion vector candidate list. In addition, the code amount of the index indicating the motion vector for the current block is dependent on the position of the motion vector for the current block in the motion vector candidate list. For example, the code amount of the index indicating the motion vector for the current block in the motion vector candidate list is dependent on the order of candidates in the motion vector candidate list.

Accordingly, the code amount of the index indicating the motion vector for the current block in the motion vector candidate list may increase depending on the maximum list size of the motion vector candidate list and the order of candidates in the motion vector candidate list.

In view of this, for example, an encoder according to an aspect of the present disclosure is an encoder which encodes a video into a bitstream using a predicted image, and which includes circuitry and memory. Using the memory, the circuitry generates a list which includes a plurality of candidates for a first motion vector for a first partition in the video, and in which the plurality of candidates includes a candidate which is derived from a second motion vector of a second partition different from the first partition in the video. The list has a maximum list size and an order of the plurality of candidates, and at least one of the maximum list size or the order of the plurality of candidates is dependent on at least one of a partition size or a partition shape of the first partition. Using the memory, the circuitry: selects the first motion vector from the plurality of candidates included in the list; encodes an index indicating the first motion vector among the plurality of candidates in the list into the bitstream based on the maximum list size; and generates the predicted image for the first partition using the first motion vector.

In this way, the encoder is capable of generating the motion vector candidate list based on the maximum list size or the order of the candidates which is dependent on the partition size or the partition shape. Accordingly, the encoder is capable of generating the appropriate candidate list based on the partition size or the partition shape. In other words, the encoder is capable of appropriately configuring information for prediction. Accordingly, the encoder is capable of contributing to reduction in code amount.

In addition, for example, the maximum list size is a first list size when the partition size is a first partition size, and the maximum list size is a second list size larger than the first list size when the partition size is a second partition size smaller than the first partition size.

In this way, the encoder is capable of selecting the appropriate motion vector from among the large number of motion vector candidates for the small partition. On the other hand, there is the possibility that no appropriate motion vector is included in the large number of motion vector candidates for the large partition. Accordingly, the encoder is capable of contributing to reduction in code amount of the index indicating the motion vector by using the motion vector candidate list having the small maximum list size for the large partition.

In addition, for example, the maximum list size is a first list size when the partition size is a first partition size, and the maximum list size is a second list size smaller than the first list size when the partition size is a second partition size smaller than the first partition size.

In this way, the encoder is capable of selecting the appropriate motion vector from among the large number of motion vector candidates for the large partition. Accordingly the encoder is capable of simplifying the processing and contributing to reduction in code amount of the index indicating the motion vector by using the motion vector candidate list having the small maximum list size for the small partition.

In addition, for example, the maximum list size is dependent on the partition shape, and the partition shape is one of a square, a rectangle, and a triangle.

In this way, the encoder is capable of generating the appropriate candidate list based on the partition shape which is one of a square, a rectangle, or a triangle.

In addition, for example, the maximum list size is a first list size when the partition shape is a triangle, and the maximum list size is a second list size larger than the first list size when the partition shape is not a triangle.

In this way, the encoder is capable of selecting the appropriate motion vector from among the large number of motion vector candidates for the rectangular partition. On the other hand, there is a possibility that the number of referable processed partitions is small and the number of derivable motion vector candidates is small around the triangular partition. Accordingly, the encoder is capable of contributing to reduction in code amount of the index indicating the motion vector by using the motion vector candidate list having the small maximum list size for the triangular partition.

In addition, for example, the maximum list size is a first list size when the partition shape is a square, and the maximum list size is a second list size larger than the first list size when the partition shape is not a square.

In this way, the encoder is capable of selecting an appropriate motion vector from among a large number of motion vector candidates for a partition having a complicated shape. Accordingly, the encoder is capable of simplifying processing and contributing to reduction in code amount of an index indicating a motion vector by using a motion vector candidate list having a small maximum list size for a partition having a simple shape.

In addition, for example, the circuitry: encodes the index using a first number of bits when the maximum list size is a first list size; and encodes the index using a second number of bits larger than the first number of bits when the maximum list size is a second list size larger than the first list size.

In this way, the encoder is capable of encoding the index using the appropriate number of bits based on the maximum list size.

In addition, for example, the second partition is a partition which neighbors the first partition.

In this way, the encoder is capable of deriving a candidate for the motion vector for the current partition from a motion vector of a partition that neighbors the current partition. Accordingly, the encoder is capable of appropriately deriving the candidate for the motion vector for the current partition from the motion vector that is assumed to be similar to the motion vector for the current partition.

In addition, for example, a decoder according to an aspect of the present disclosure is a decoder which decodes a video from a bitstream using a predicted image, and which includes circuitry and memory. Using the memory, the circuitry generates a list which includes a plurality of candidates for a first motion vector for a first partition in the video, and in which the plurality of candidates includes a candidate which is derived from a second motion vector of a second partition different from the first partition in the video. The list has a maximum list size and an order of the plurality of candidates, and at least one of the maximum list size or the order of the plurality of candidates is dependent on at least one of a partition size or a partition shape of the first partition. Using the memory the circuitry: decodes an index indicating the first motion vector among the plurality of candidates in the list from the bitstream based on the maximum list size; selects the first motion vector from the plurality of candidates in the list using the index; and generates the predicted image for the first partition using the first motion vector.

In this way, the decoder is capable of generating the motion vector candidate list based on the maximum list size or the order of the candidates which is dependent on the partition size or the partition shape. Accordingly, the decoder is capable of generating the appropriate candidate list based on the partition size or the partition shape. In other words, the decoder is capable of appropriately configuring information for prediction. Accordingly, the decoder is capable of contributing to reduction in code amount.

In addition, for example, the maximum list size is a first list size when the partition size is a first partition size, and the maximum list size is a second list size larger than the first list size when the partition size is a second partition size smaller than the first partition size.

In this way, the decoder is capable of selecting the appropriate motion vector from among the large number of motion vector candidates for the small partition. On the other hand, there is a possibility that no appropriate motion vector is included in the large number of motion vector candidates for the large partition. Accordingly, the decoder is capable of contributing to reduction in code amount of the index indicating the motion vector by using the motion vector candidate list having the small maximum list size for the large partition.

In addition, for example, the maximum list size is a first list size when the partition size is a first partition size, and the maximum list size is a second list size smaller than the first list size when the partition size is a second partition size smaller than the first partition size.

In this way, the decoder is capable of selecting the appropriate motion vector from among the large number of motion vector candidates for the large partition. On the other hand, the decoder is capable of simplifying the processing and contributing to reduction in code amount of the index indicating the motion vector by using the motion vector candidate list having the small maximum list size for the small partition.

In addition, for example, the maximum list size is dependent on the partition shape, and the partition shape is one of a square, a rectangle, and a triangle.

In this way, the decoder is capable of generating the appropriate candidate list based on the partition shape which is one of a square, a rectangle, or a triangle.

In addition, for example, the maximum list size is a first list size when the partition shape is a triangle, and the maximum list size is a second list size larger than the first list size when the partition shape is not a triangle.

In this way, the decoder is capable of selecting the appropriate motion vector from among the large number of motion vector candidates for the rectangular partition. On the other hand, there is a possibility that the number of referable processed partitions is small and the number of derivable motion vector candidates is small around the triangular partition. Accordingly, the decoder is capable of contributing to reduction in code amount of the index indicating the motion vector by using the motion vector candidate list having the small maximum list size for the triangular partition.

In addition, for example, the maximum list size is a first list size when the partition shape is a square, and the maximum list size is a second list size larger than the first list size when the partition shape is not a square.

In this way, the decoder is capable of selecting an appropriate motion vector from among a large number of motion vector candidates for a partition having a complicated shape. On the other hand, the decoder is capable of simplifying processing and contributing to reduction in code amount of an index indicating a motion vector by using a motion vector candidate list having a small maximum list size for a partition having a simple shape.

In addition, for example, the circuitry: decodes the index using a first number of bits when the maximum list size is a first list size; and decodes the index using a second number of bits larger than the first number of bits when the maximum list size is a second list size larger than the first list size.

In this way, the decoder is capable of decoding the index using the appropriate number of bits based on the maximum list size.

In addition, for example, the second partition is a partition which neighbors the first partition.

In this way, the decoder is capable of deriving a candidate for the motion vector for the current partition from a motion vector of a partition that neighbors the current partition. Accordingly, the decoder is capable of appropriately deriving the candidate for the motion vector for the current partition from the motion vector that is assumed to be similar to the motion vector for the current partition.

In addition, for example, an encoding method according to an aspect of the present disclosure is an encoding method of encoding a video into a bitstream using a predicted image. The encoding method includes generating a list which includes a plurality of candidates for a first motion vector for a first partition in the video, and in which the plurality of candidates includes a candidate which is derived from a second motion vector of a second partition different from the first partition in the video. The list has a maximum list size and an order of the plurality of candidates, and at least one of the maximum list size or the order of the plurality of candidates is dependent on at least one of a partition size or a partition shape of the first partition. The encoding method includes: selecting the first motion vector from the plurality of candidates included in the list; encoding an index indicating the first motion vector among the plurality of candidates in the list into the bitstream based on the maximum list size; and generating the predicted image for the first partition using the first motion vector.

In this way, it is possible to generate the motion vector candidate list based on the maximum list size or the order of the candidates which is dependent on the partition size or the partition shape. Accordingly, it is possible to generate the appropriate candidate list based on the partition size or the partition shape. In other words, it is possible to appropriately configure information for prediction. Thus, it is possible to contribute to reduction in code amount.

In addition, for example, a decoding method according to an aspect of the present disclosure is a decoding method of decoding a video from a bitstream using a predicted image. The decoding method includes generating a list which includes a plurality of candidates for a first motion vector for a first partition in the video, and in which the plurality of candidates includes a candidate which is derived from a second motion vector of a second partition different from the first partition in the video. The list has a maximum list size and an order of the plurality of candidates, and at least one of the maximum list size or the order of the plurality of candidates is dependent on at least one of a partition size or a partition shape of the first partition. The decoding method includes: decoding an index indicating the first motion vector among the plurality of candidates in the list from the bitstream based on the maximum list size; selecting the first motion vector from the plurality of candidates in the list using the index; and generating the predicted image for the first partition using the first motion vector.

In this way, the decoder is capable of generating the motion vector candidate list based on the maximum list size or the order of the candidates which is dependent on the partition size or the partition shape. Accordingly, the decoder is capable of generating the appropriate candidate list based on the partition size or the partition shape. In other words, the decoder is capable of appropriately configuring information for prediction. Accordingly, the decoder is capable of contributing to reduction in code amount.

In addition, for example, an encoder according to an aspect of the present disclosure is an encoder which encodes a video into a bitstream using a predicted image, and includes a splitter, an intra predictor, an inter predictor, a transformer, a quantizer, and an entropy encoder.

The splitter splits a current picture to be processed included in the video in a plurality of blocks. The intra predictor generates the predicted image for the current block in the current picture using a reference image in the current picture. The inter predictor generates the predicted image using a reference image in a reference picture different from the current picture.

The transformer transforms a difference image between the predicted image generated by either the intra predictor or the inter predictor and an image of the current block to generate a plurality of transform coefficients. The quantizer quantizes the plurality of transform coefficients to generate a plurality of quantized coefficients. The entropy encoder encodes the plurality of quantized coefficients into the bitstream.

In addition, the inter predictor generates a list which includes a plurality of candidates for a first motion vector for a first partition in the video, and in which the plurality of candidates includes a candidate which is derived from a second motion vector of a second partition different from the first partition in the video. The list has a maximum list size and an order of the plurality of candidates, and at least one of the maximum list size or the order of the plurality of candidates is dependent on at least one of a partition size or a partition shape of the first partition. The inter predictor selects the first motion vector from the plurality of candidates included in the list, and encodes an index indicating the first motion vector among the plurality of candidates in the list into the bitstream based on the maximum list size.

In addition, the entropy encoder encodes an index indicating the first motion vector among the plurality of candidates in the list into the bitstream based on the maximum list size. In addition, the inter predictor generates the predicted image for the first partition using the first motion vector.

In addition, for example, a decoder according to an aspect of the present disclosure is a decoder which decodes a video from a bitstream using a predicted image, and includes an entropy decoder, an inverse quantizer, an inverse transformer, an intra predictor, an inter predictor, and an adder (reconstructor).

The entropy decoder decodes a plurality of quantized coefficients from the bitstream. The inverse quantizer inverse quantizes the plurality of quantized coefficients to obtain a plurality of transform coefficients. The inverse transformer inverse transforms the plurality of transform coefficients to obtain a difference image.

The intra predictor generates the predicted image for a current block to be processed in a current picture using a reference image in the current picture included in the video. The inter predictor generates the predicted image using a reference image in a reference picture different from the current picture. The adder adds the predicted image generated by either the intra predictor or the inter predictor and the difference image to reconstruct an image of the current block.

In addition, the inter predictor generates a list which includes a plurality of candidates for a first motion vector for a first partition in the video, and in which the plurality of candidates includes a candidate which is derived from a second motion vector of a second partition different from the first partition in the video. The list has a maximum list size and an order of the plurality of candidates, and at least one of the maximum list size or the order of the plurality of candidates is dependent on at least one of a partition size or a partition shape of the first partition.

In addition, the entropy decoder decodes an index indicating the first motion vector among the plurality of candidates in the list from the bitstream based on the maximum list size. In addition, the inter predictor selects the first motion vector from the plurality of candidates in the list using the index, and generates the predicted image for the first partition using the first motion vector.

Furthermore, these general or specific aspects may be implemented using a system, an apparatus, a method, an integrated circuit, a computer program, or a non-transitory computer-readable recording medium such as a CD-ROM, or any combination of systems, apparatuses, methods, integrated circuits, computer programs, or computer-readable recording media.

Hereinafter, embodiments will be described with reference to the drawings.

It is to be noted that the embodiments described below each indicates a general or specific example. The numerical values, shapes, materials, constituent elements, the arrangement and connection of the constituent elements, steps, order of the steps, etc., indicated in the following embodiment and variations are mere examples, and therefore are not intended to limit the scope of the claims. Therefore, among the constituent elements in the following embodiments, those not recited in any of the independent claims defining the broadest inventive concepts are described as optional components.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder Outline]

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
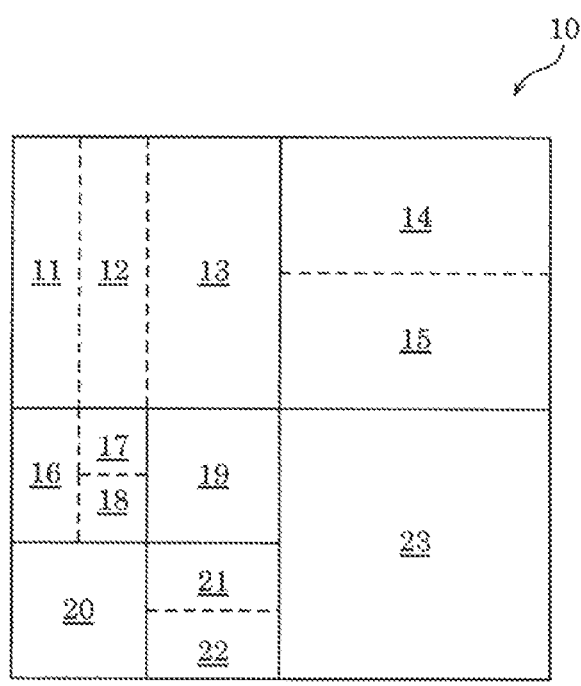
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, $C=5D+A$). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
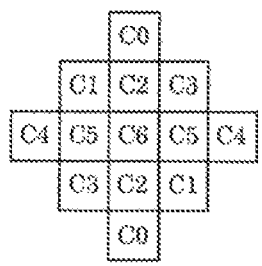
FIG. 4A illustrates one example of a filter shape used in ALF.
Figure 4B:
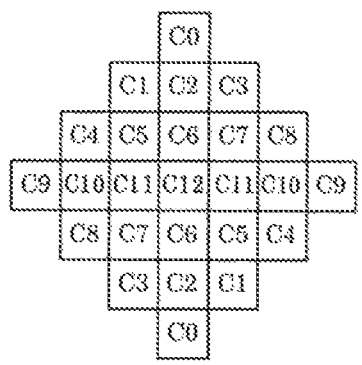
FIG. 4B illustrates another example of a filter shape used in ALF.
Figure 4C:
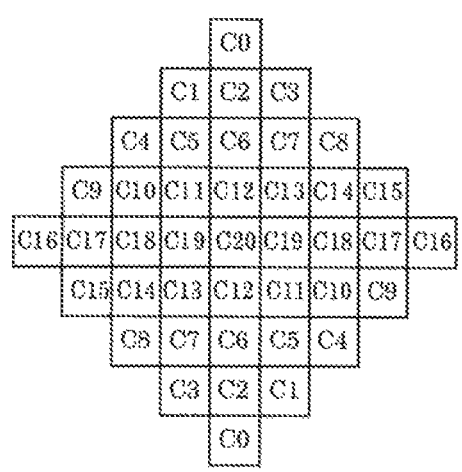
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPTL 1).

Figure 5A:
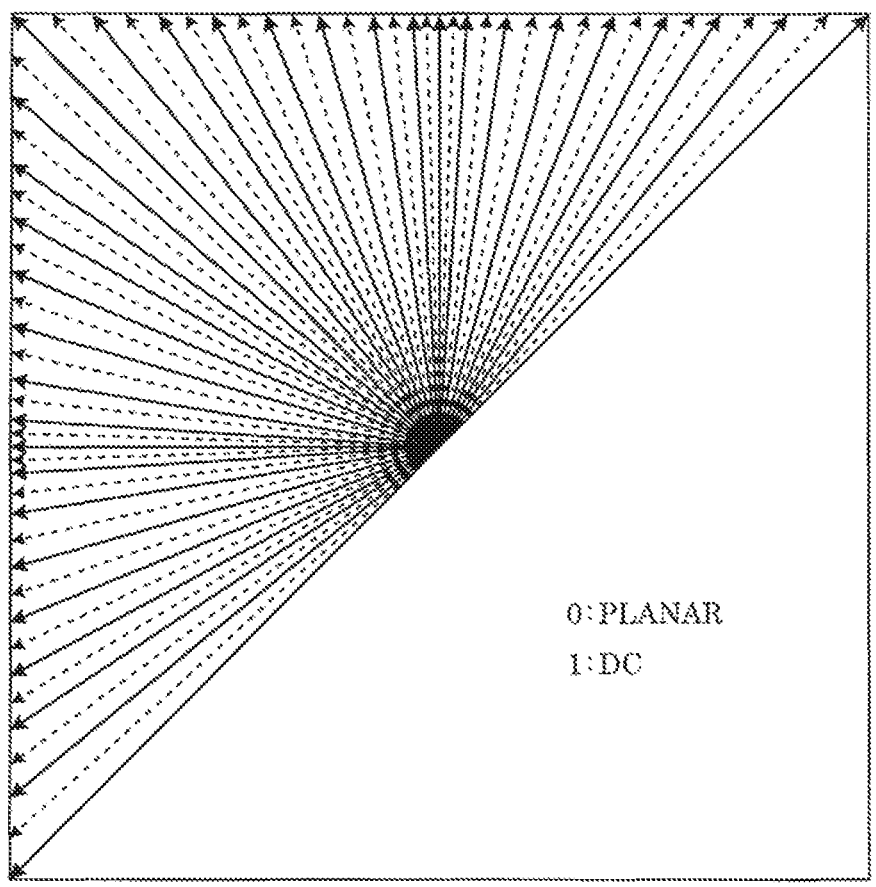
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Figure 5B:
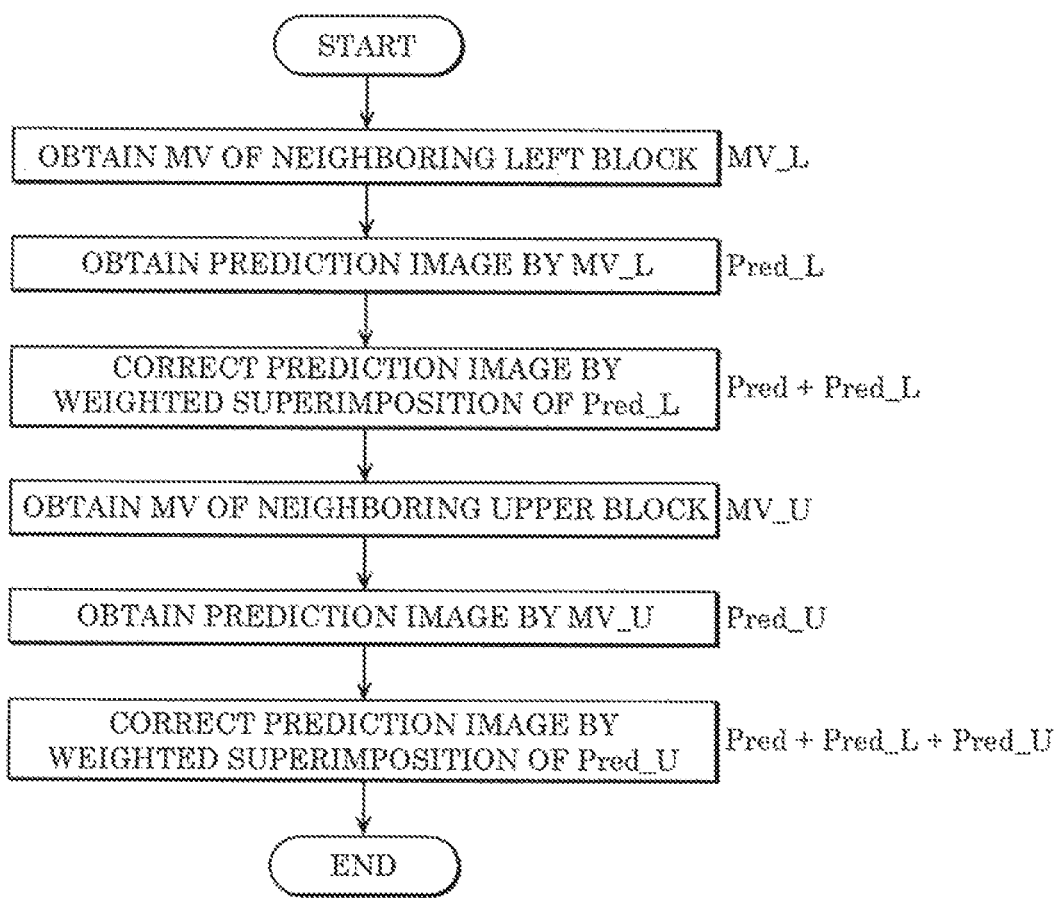
FIG. 5B is a flow chart for illustrating an outline of a prediction image correction process performed via OBMC processing.
Figure 5C:
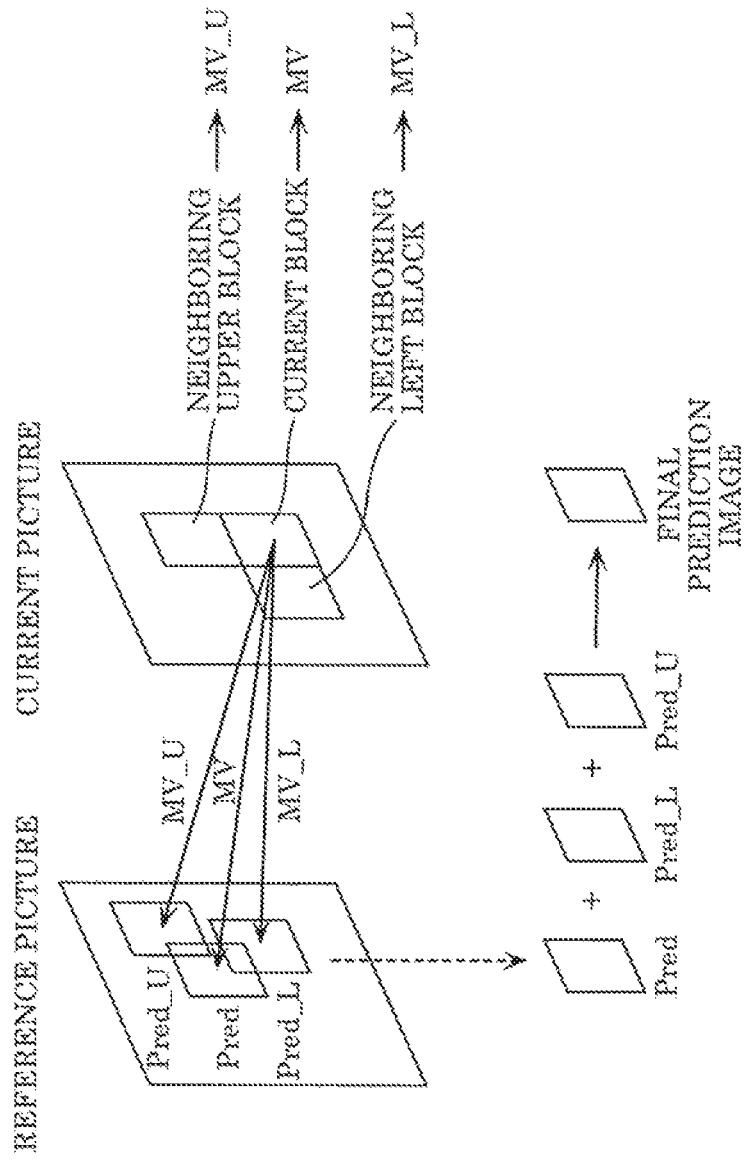
FIG. 5C is a conceptual diagram for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
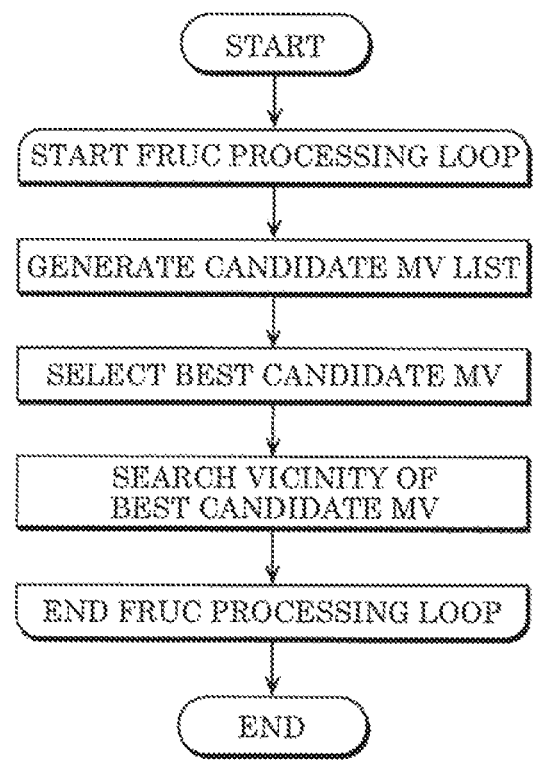
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
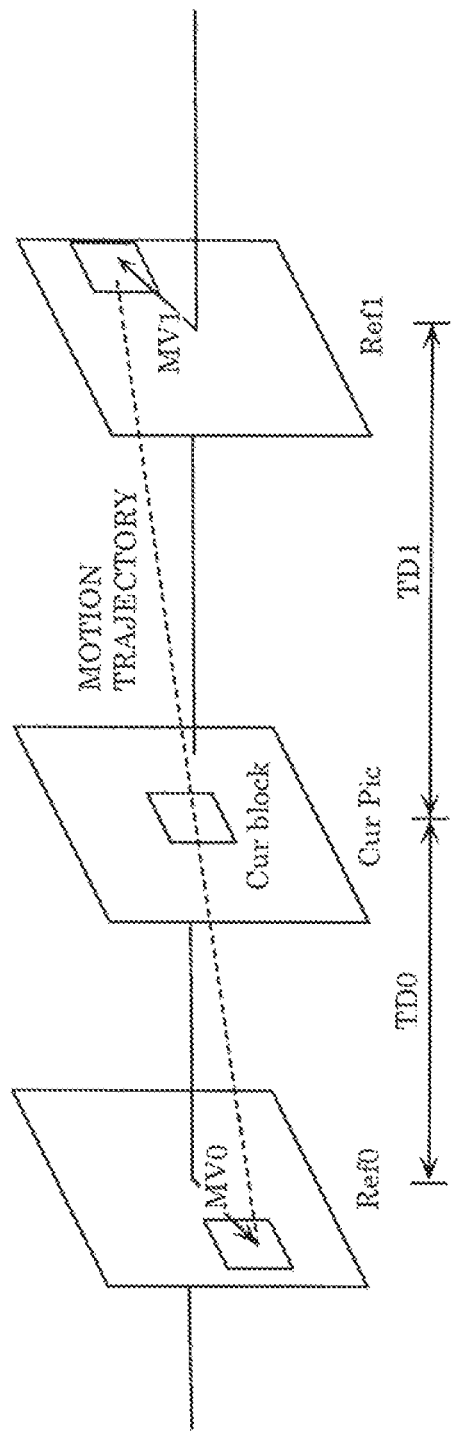
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
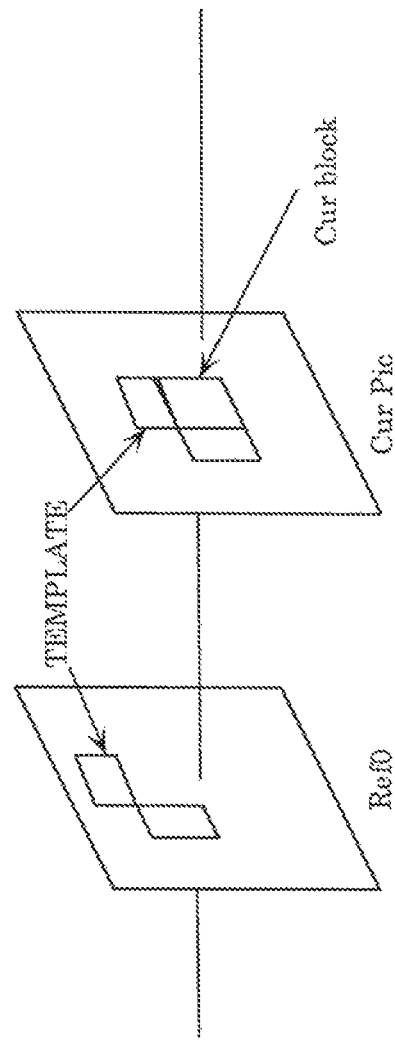
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
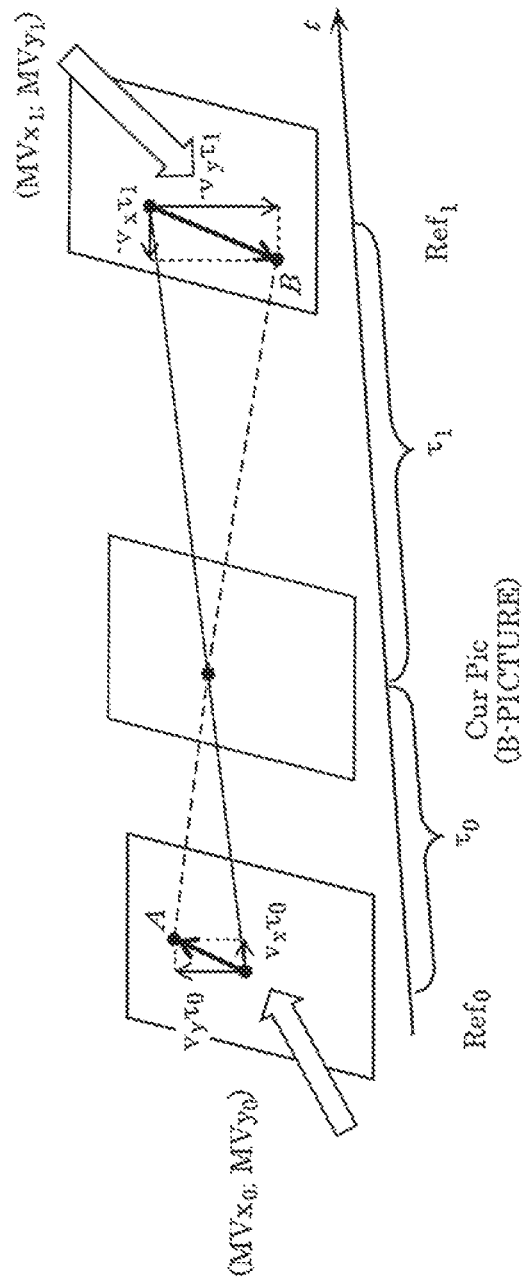
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation is given.

MATH. 1

$$\partial I^{(k)}/\partial t + v_x \partial I^{(k)}/\partial x + v_y \partial I^{(k)}/\partial y = 0. \quad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
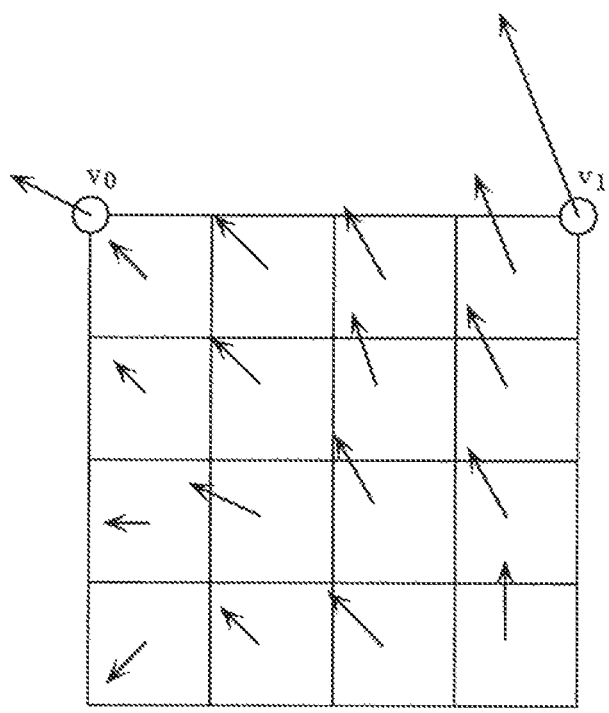
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

Math. 2

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of IV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

Figure 9C:
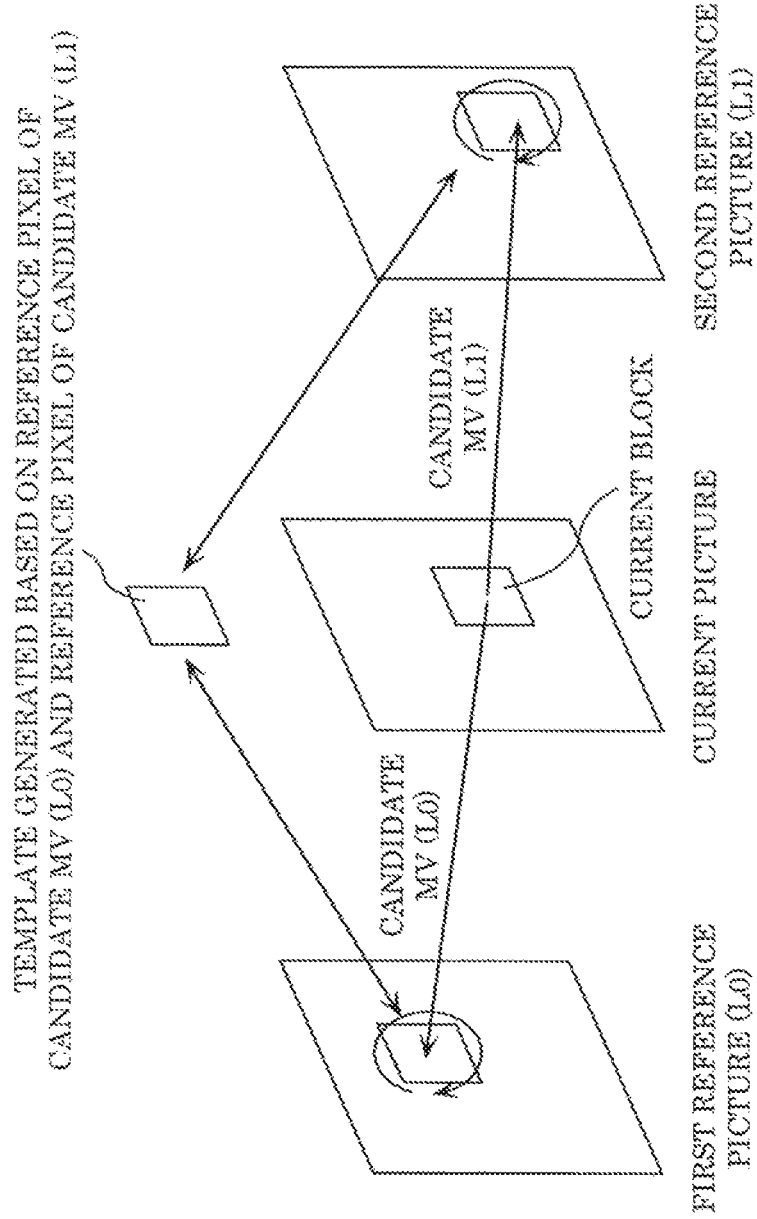
FIG. 9C is a conceptual diagram for illustrating an outline of DMVR processing.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
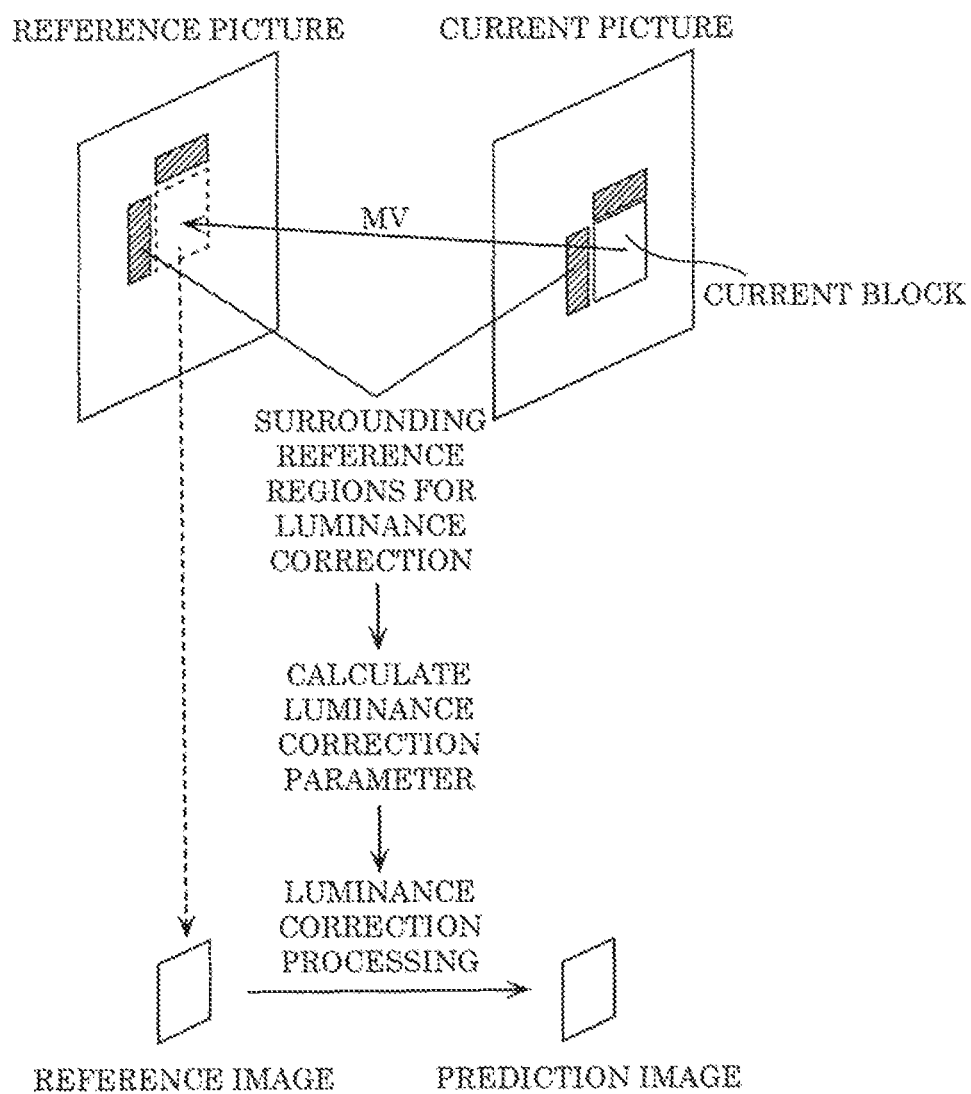
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

[Decoder Outline]

Figure 10:
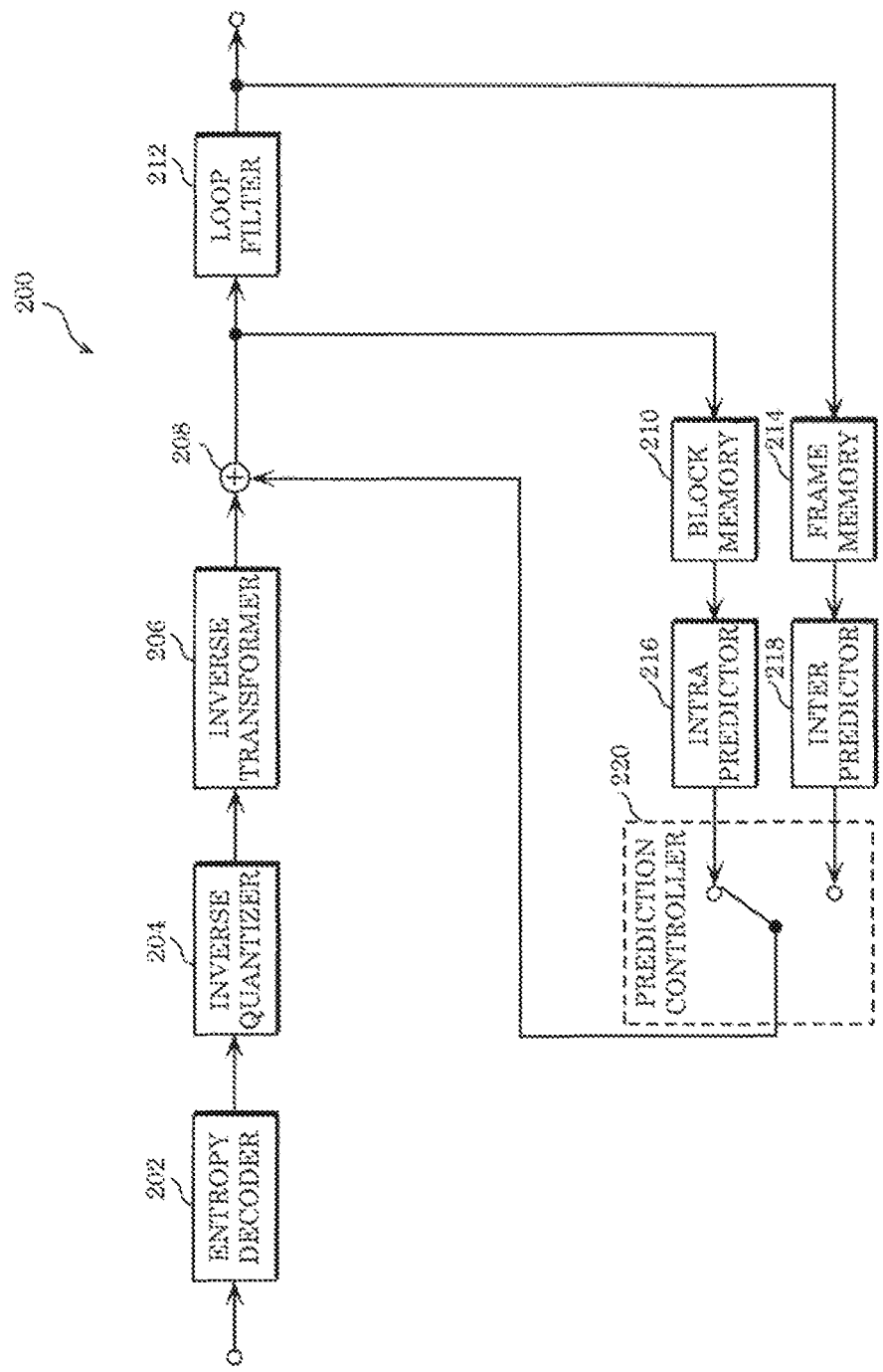
FIG. 10 is a block diagram illustrating a functional configuration of a decoder according to Embodiment 1.

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

[Details of Inter Prediction]

In the inter prediction according to this embodiment, a motion vector candidate list is generated for a current partition to be processed, and a motion vector for the current partition is selected from the motion vector candidate list. A predicted image for the current partition is then generated using the motion vector for the current partition. The current partition is then encoded and decoded using the predicted image.

Here, the partition is a partition included in an image, and can also be represented as a block, an area, or a range. The partition may be a coding unit or a sub-coding unit obtainable by splitting a coding unit. In addition, the partition may be a prediction unit or a sub-prediction unit obtainable by splitting a prediction unit. In addition, the partition may be a transform unit or a sub-transform unit obtainable by splitting a transform unit.

In addition, the partition may be a rectangular partition or a non-rectangular partition. In addition, the rectangular partition may be a square partition or a non-square partition. In addition, the non-rectangular partition may be a triangular partition or a partition having another shape.

The motion vector candidate list can be represented as a motion vector candidate list or simply as a list. The motion vector candidate list for the current partition includes a plurality of candidates for the motion vector for the current partition. The candidates can also be represented as motion vector predictors or motion vector candidates. The candidates included in the motion vector candidate list for the current partition are derived from, for example, motion vectors for neighboring partitions that neighbor the current partition. The motion vector candidate list may be the merge list or the list in FRUC mode described above, or a list in another mode.

Specifically, motion vectors of neighboring partitions may be derived as candidates. In addition, the candidates may be derived by scaling motion vectors of neighboring partitions. Here, the motion vectors of the neighboring partitions are motion vectors used to encode or decode the neighboring partitions.

In addition, among the plurality of candidates in the motion vector candidate list for the current partition, a merge index parameter indicating the motion vector for the current partition is encoded and decoded. In this way, the same motion vector is selected and used for encoding and decoding in encoder 100 and decoder 200. The merge index parameter can also be represented as a merge vector index parameter or simply as an index. The merge index parameter indicates any of the plurality of candidates in the motion vector candidate list. As a matter of course, the motion vector candidate list is not limited to the motion vector candidate list in merge mode.

Hereinafter, descriptions are given of a plurality of specific modes for inter prediction performed by encoder 100 and decoder 200.

[First Aspect of Inter Prediction]

In this embodiment, a maximum number of motion vector candidates in a motion vector candidate list, that is, a maximum list size of the motion vector candidate list is dependent adaptively on a partition size. The maximum list size can also be represented as an upper limit size or simply as a list size.

A merge index parameter for selecting a motion vector from the motion vector candidate list is encoded into a bitstream in encoder 100, and the encoded merge index parameter is decoded from the bitstream in decoder 200. At that time, the merge index parameter is encoded using arithmetic encoding and is decoded using arithmetic decoding.

The code size of the merge index parameter is dependent on the maximum number of motion vector candidates. In other words, the code amount of the merge index parameter is dependent on the maximum list size of the motion vector candidate list. When the maximum list size is a first list size smaller than a second list size, a merge index parameter is encoded and decoded using a small number of bits compared with the case where the maximum list size is the second list size.

For example, when the maximum list size is small, at least one of the upper limit or the lower limit in the number of bits of a merge index parameter is small compared with the case where the maximum list size is large.

Figure 11:
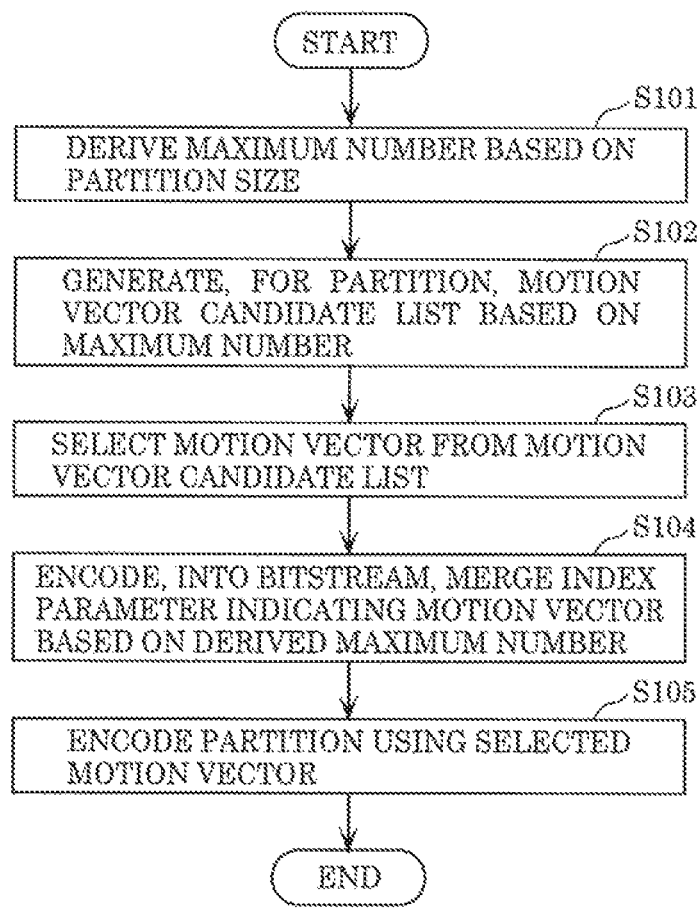
FIG. 11 is a flow chart indicating a first aspect of inter prediction performed by an encoder according to Embodiment 1.

FIG. 11 is a flow chart indicating the first aspect of inter prediction performed by encoder 100 illustrated in FIG. 1.

First, inter predictor 126 in encoder 100 derives a maximum number based on the partition size of a current partition to be processed (S101). The maximum number is a maximum size of motion vector candidates for the motion vector to be used to predict the current partition. Inter predictor 126 derives a different maximum number based on a partition size. For example, inter predictor 126 may drive a smaller maximum number for a larger partition than for a smaller partition. In other words, inter predictor 126 may drive a larger maximum number for the smaller partition than for the larger partition.

Next, inter predictor 126 generates a plurality of motion vector candidates for the current partition until the number of motion vector candidates reaches the maximum number to generate a motion vector candidate list (S102). Inter predictor 126 then selects a motion vector for the current partition from the motion vector candidate list (S103).

Next, entropy encoder 110 of encoder 100 encodes a merge index parameter indicating the motion vector for the current partition among the plurality of motion vector candidates in the motion vector candidate list. At that time, entropy encoder 110 encodes, into a bitstream, a merge index parameter based on the derived maximum number (S104).

For example, entropy encoder 110 binarizes the merge index parameter into a plurality of bits, and encodes the plurality of bits using arithmetic encoding. In the binarization method and the arithmetic encoding method, the merge index parameter can be represented as a small number of bits when the derived maximum number is small compared with the case where the derived maximum number is large.

Lastly, encoder 100 encodes the current partition using the selected motion vector (S105).

Specifically, inter predictor 126 generates a predicted image of the current partition using the selected motion vector. Subtractor 104 derives a difference image between the original image and the predicted image of the current partition. Transformer 106 transforms the difference image into a plurality of transform coefficients. Quantizer 108 quantizes the plurality of transform coefficients. Entropy encoder 110 then encodes the quantized plurality of transform coefficients into a bitstream.

Figure 12:
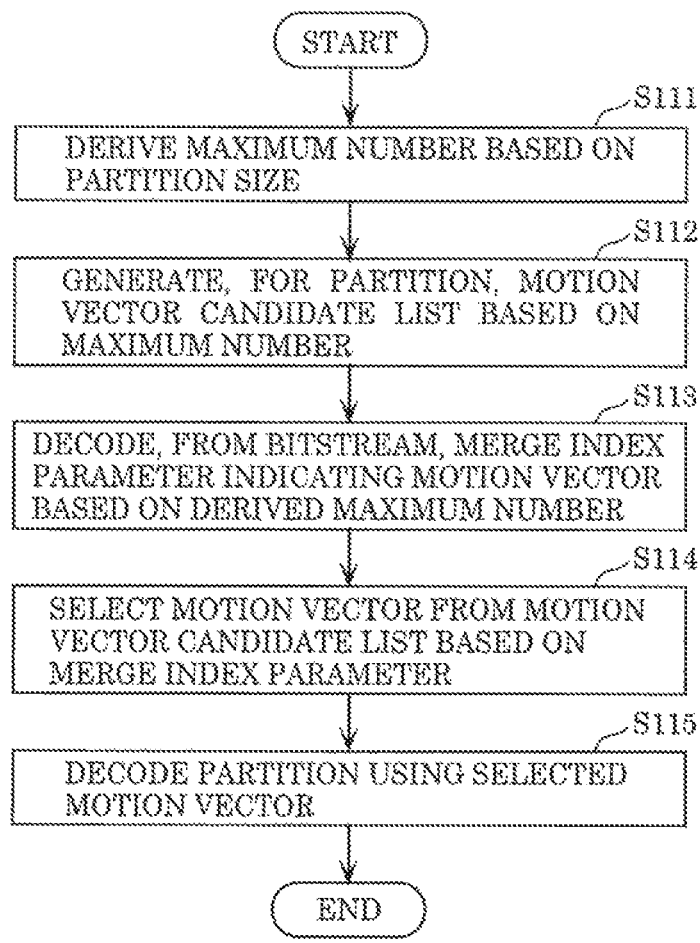
FIG. 12 is a flow chart indicating the first aspect of inter prediction performed by a decoder according to Embodiment 1.

FIG. 12 is a flow chart indicating the first aspect of inter prediction performed by decoder 200 illustrated in FIG. 10.

First, inter predictor 218 in decoder 200 derives a maximum number based on the partition size of a current partition to be processed (S111). The maximum number is a maximum size of motion vector candidates for the motion vector to be used to predict the current partition. Inter predictor 218 derives a different maximum number based on a partition size. For example, inter predictor 218 may drive a smaller maximum number for a larger partition than for a smaller partition.

Next, inter predictor 218 generates a plurality of motion vector candidates for the current partition until the number of motion vector candidates reaches the maximum number to generate a motion vector candidate list (S112). In addition, entropy decoder 202 in decoder 200 decodes, from a bitstream, a merge index parameter based on the derived maximum number (S113). For example, entropy decoder 202 decodes the merge index parameter using arithmetic decoding.

This merge index parameter indicates the motion vector for the partition among the plurality of motion vector candidates in the motion vector candidate list. Inter predictor 218 selects a motion vector for the current partition from the motion vector candidate list based on the merge index parameter (S114). In the binarization method and the arithmetic encoding method, the merge index parameter can be represented as a small number of bits when the derived maximum number is small compared with the case where the derived maximum number is large.

Lastly, decoder 200 decodes the current partition using the selected motion vector (S115).

Specifically, inter predictor 218 generates a predicted image of the current partition using the selected motion vector. Entropy decoder 202 decodes, from the bitstream, the quantized plurality of transform coefficients. Inverse quantizer 204 inverse quantizes the quantized plurality of transform coefficients. Inverse transformer 206 transforms the plurality of transform coefficients into a difference image. Adder 208 adds the difference image and the predicted image to reconstruct an image.

The motion vector candidate list includes a plurality of candidates for the motion vector for the current partition. The numbers of motion vector candidates vary between two partitions having different partition sizes. In other words, two maximum list sizes for the two motion vector candidate lists to be generated for the two partitions having the different partition sizes vary.

Figure 13:
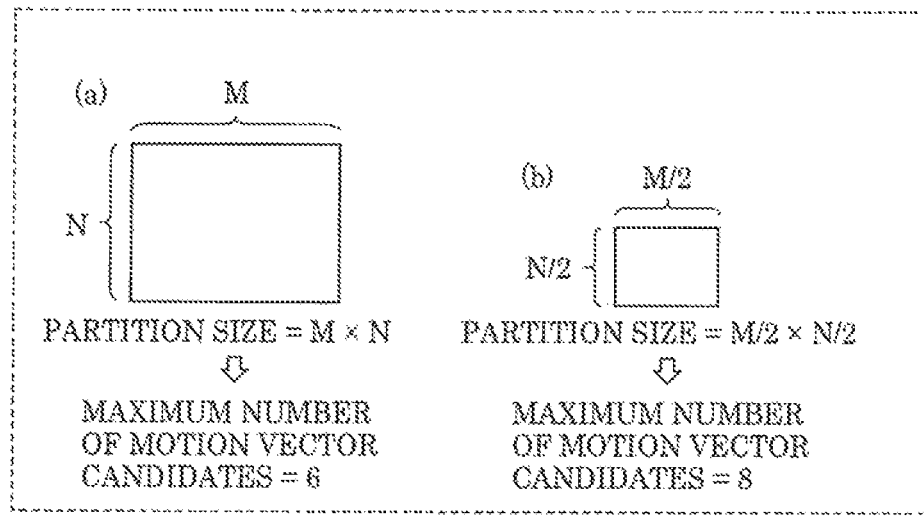
FIG. 13 is a conceptual diagram illustrating examples of maximum numbers of motion vector candidates which are dependent on partition sizes according to Embodiment 1.

FIG. 13 illustrates examples of the maximum numbers of motion vector candidates relating to partition sizes. In this example, when the partition size of a first partition is larger than the partition size of a second partition, the maximum number of motion vectors for the first partition is smaller than the maximum number of motion vectors for the second partition.

In this way, it is highly likely that encoder 100 and decoder 200 can select an appropriate motion vector from among a large number of motion vector candidates for the small partition.

On the other hand, there is a possibility that no appropriate motion vector is included in the large number of motion vector candidates for the large partition. Accordingly, encoder 100 and decoder 200 are capable of contributing to reduction in code amount of the index indicating the motion vector by using the motion vector candidate list having the small maximum list size for the large partition.

Figure 14:
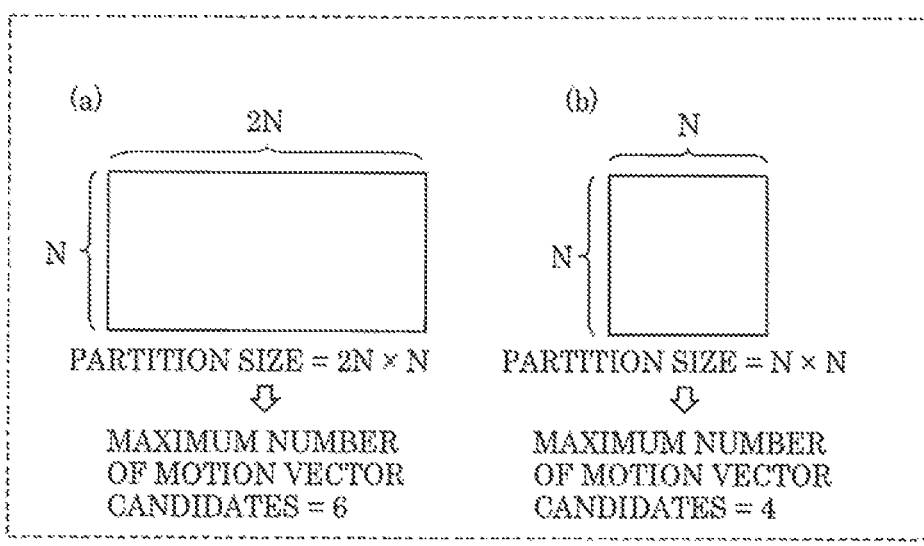
FIG. 14 is a conceptual diagram illustrating other examples of maximum numbers of motion vector candidates which are dependent on partition sizes according to Embodiment 1.

FIG. 14 illustrates other examples of the maximum numbers of motion vector candidates relating to partition sizes. In this example, when the partition size of a first partition is larger than the partition size of a second partition, the maximum number of motion vectors for the first partition is larger than the maximum number of motion vectors for the second partition. In other words, when the partition size of the first partition is smaller than the partition size of the second partition, the maximum number of motion vectors for the first partition is smaller than the maximum number of motion vectors for the second partition.

When a small block is used, the total number of blocks increases. In this way, there is a possibility that the total number of blocks increases and the code amount increases. In the examples in FIG. 14, encoder 100 and decoder 200 are capable of reducing increase in code amount by using the motion vector candidate list having the small maximum list size for the small partition.

In this aspect, the maximum numbers of motion vector candidates for the motion vectors are adaptively determined based on the partition sizes. In this way, it is possible to increase the coding efficiency and optimize the computation amount. In addition, it is possible to increase the image quality through the appropriate prediction processing.

It is to be noted that encoder 100 and decoder 200 perform inter prediction in the same manner. In addition, at least part of this aspect may be combined with at least part of other one or more aspects. In addition, any of the processes, elements, syntaxes, features, and an optional combination of these according to this aspect may be applied to any of the aspects.

All the above-described processes do not always need to be included in a method, and all the elements do not always need to be included in a device. In other words, part of the plurality of processes described above do not always need to be included in the method, and part of the plurality of elements described above do not always need to be included in the device.

[Second Aspect of Inter Prediction]

In this embodiment, a maximum number of motion vector candidates in a motion vector candidate list, that is, a maximum list size of the motion vector candidate list is dependent adaptively on a partition shape. The maximum list size can also be represented as an upper limit size or simply as a list size.

A merge index parameter for selecting a motion vector from the motion vector candidate list is encoded into a bitstream in encoder 100, and the encoded merge index parameter is decoded from the bitstream in decoder 200. At that time, the merge index parameter is encoded using arithmetic encoding and is decoded using arithmetic decoding.

The code size of the merge index parameter is dependent on the maximum number of motion vector candidates. In other words, the code amount of the merge index parameter is dependent on the maximum list size of the motion vector candidate list. When the maximum list size is a first list size smaller than a second list size, a merge index parameter is encoded and decoded using a small number of bits compared with the case where the maximum list size is the second list size.

For example, when the maximum list size is small, at least one of the upper limit or the lower limit in the number of bits of a merge index parameter is small compared with the case where the maximum list size is large.

Figure 15:
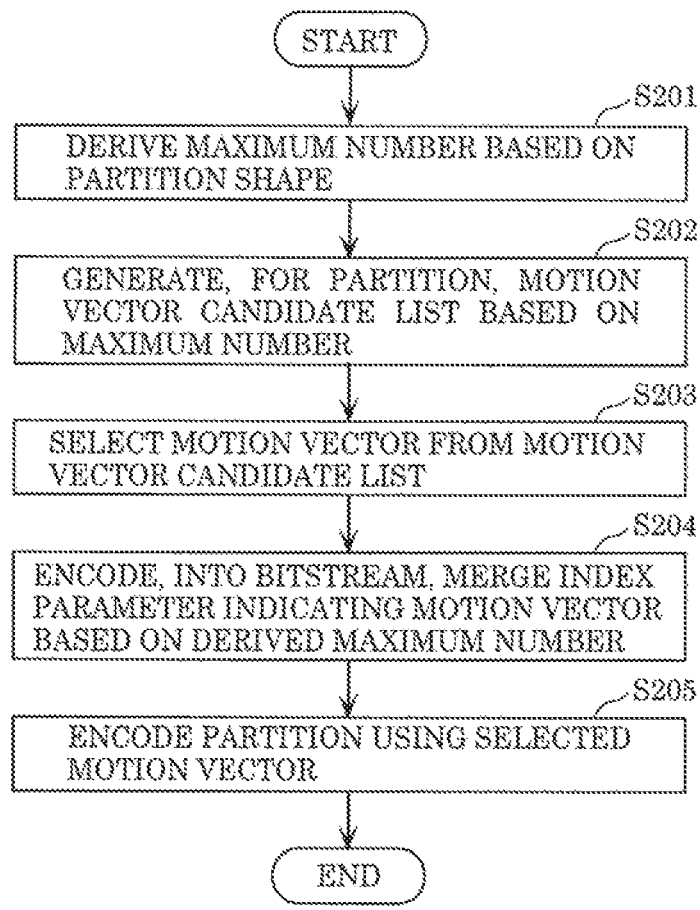
FIG. 15 is a flow chart indicating a second aspect of inter prediction performed by the encoder according to Embodiment 1.

FIG. 15 is a flow chart indicating the second aspect of inter prediction performed by encoder 100 illustrated in FIG. 1.

First, inter predictor 126 in encoder 100 derives a maximum number based on the partition shape of a current partition to be processed (S201). The maximum number is a maximum size of motion vector candidates for the motion vector to be used to predict the current partition. Inter predictor 126 derives a different maximum number based on a different partition shape. For example, inter predictor 126 may derive a smaller maximum number for a non-rectangular (triangular) partition than a maximum number for a rectangular partition.

Next, inter predictor 126 generates a plurality of motion vector candidates for the current partition until the number of motion vector candidates reaches the maximum number to generate a motion vector candidate list (S202). Inter predictor 126 then selects a motion vector for the current partition from the motion vector candidate list (S203).

Next, entropy encoder 110 of encoder 100 encodes a merge index parameter indicating the motion vector for the current partition among the plurality of motion vector candidates in the motion vector candidate list. At that time, entropy encoder 110 encodes, into a bitstream, a merge index parameter based on the derived maximum number (S204).

For example, entropy encoder 110 binarizes the merge index parameter into a plurality of bits, and encodes the plurality of bits using arithmetic encoding. In the binarization method and the arithmetic encoding method, the merge index parameter can be represented as a small number of bits when the derived maximum number is smaller than when the derived maximum number is large.

Lastly encoder 100 encodes the current partition using the selected motion vector (S205).

Specifically, inter predictor 126 generates a predicted image of the current partition using the selected motion vector. Subtractor 104 derives a difference image between the original image and the predicted image of the current partition. Transformer 106 transforms the difference image into a plurality of transform coefficients. Quantizer 108 quantizes the plurality of transform coefficients. Entropy encoder 110 then encodes the quantized plurality of transform coefficients into a bitstream.

Figure 16:
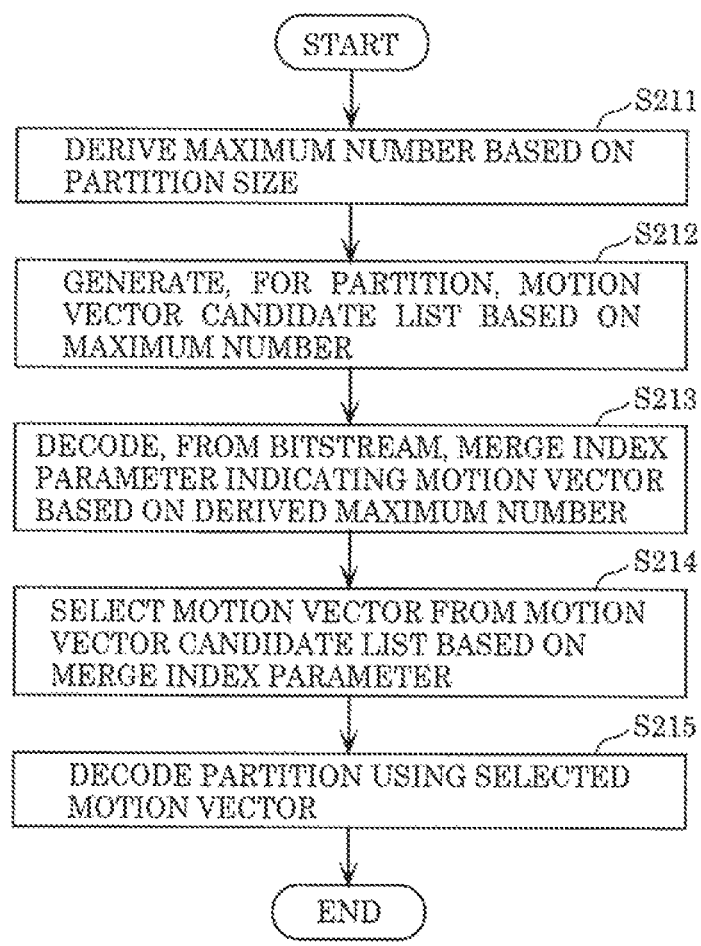
FIG. 16 is a flow chart indicating the second aspect of inter prediction performed by the decoder according to Embodiment 1.

FIG. 16 is a flow chart indicating the second aspect of inter prediction performed by decoder 200 illustrated in FIG. 10.

First, inter predictor 218 in decoder 200 derives a maximum number based on the partition shape of a current partition to be processed (S211). The maximum number is a maximum size of motion vector candidates for the motion vector to be used to predict the current partition. Inter predictor 218 derives a different maximum number based on a different partition shape. For example, inter predictor 218 may derive a smaller maximum number for a non-rectangular (triangular) partition than a maximum number for a rectangular partition.

Next, inter predictor 218 generates a plurality of motion vector candidates for the current partition until the number of motion vector candidates reaches the maximum number to generate a motion vector candidate list (S212). In addition, entropy decoder 202 in decoder 200 decodes, from a bitstream, a merge index parameter based on the derived maximum number (S213). For example, entropy decoder 202 decodes the merge index parameter using arithmetic decoding.

This merge index parameter indicates the motion vector for the partition among the plurality of motion vector candidates in the motion vector candidate list. Inter predictor 218 selects a motion vector for the current partition from the motion vector candidate list based on the merge index parameter (S214). In the binarization method and the arithmetic encoding method, the merge index parameter can be represented as a small number of bits when the derived maximum number is small compared with the case where the derived maximum number is large.

Lastly, decoder 200 decodes the current partition using the selected motion vector (S215).

Specifically, inter predictor 218 generates a predicted image of the current partition using the selected motion vector. Entropy decoder 202 decodes, from the bitstream, the quantized plurality of transform coefficients. Inverse quantizer 204 inverse quantizes the quantized plurality of transform coefficients. Inverse transformer 206 transforms the plurality of transform coefficients into a difference image. Adder 208 adds the difference image and the predicted image to reconstruct an image.

The motion vector candidate list includes a plurality of candidates for the motion vector for current partition. The numbers of maximum motion vector candidates vary between two partitions having different partition shapes. In other words, two maximum list sizes for the two motion vector candidate lists to be generated for the two partitions having the different partition shapes vary.

Figure 17:
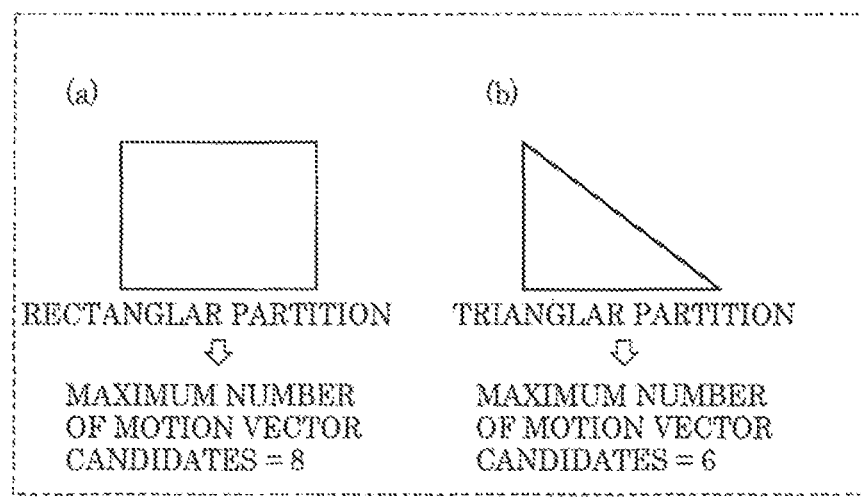
FIG. 17 is a conceptual diagram illustrating examples of maximum numbers of motion vector candidates which are dependent on partition sizes according to Embodiment 1.

FIG. 17 illustrates examples of the maximum numbers of motion vector candidates relating to partition shapes. In these examples, the maximum number of motion vector candidates for a triangular partition is smaller than the maximum number of motion vector candidates for a rectangular partition.

In this way, it is highly likely that encoder 100 and decoder 200 can select an appropriate motion vector from among a large number of motion vector candidates for the rectangular partition.

On the other hand, there is a possibility that the number of referable processed partitions is small and the number of derivable motion vector candidates is small around the triangular partition. Accordingly, encoder 100 and decoder 200 are capable of contributing to reduction in code amount of the index indicating the motion vector by using the motion vector candidate list having the small maximum list size for the triangular partition.

However, for example, when a partition that neighbors the hypotenuse of a triangular partition is available, there is a possibility that the number of referable processed partitions is large and that the number of derivable motion vector candidates is large around the triangular partition. Accordingly, the maximum number of motion vectors for the triangular partition is not limited to the examples in FIG. 17, and may be larger than the maximum number of motion vectors for the rectangular partition.

Figure 18:
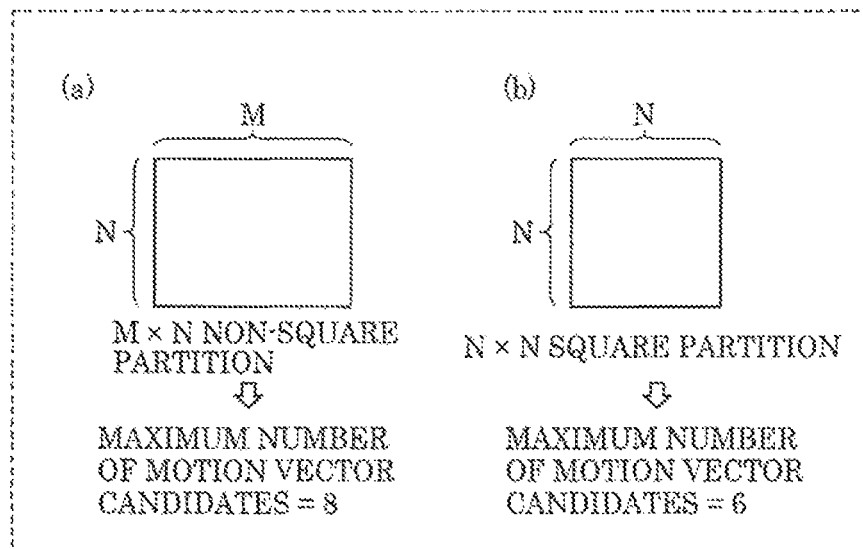
FIG. 18 is a conceptual diagram illustrating examples of maximum numbers of motion vector candidates which are dependent on partition shapes according to Embodiment 1.

FIG. 18 illustrates other examples of the maximum numbers of motion vector candidates relating to partition shapes. In these examples, the maximum number of motion vector candidates for the rectangular (non-square) partition is larger than the maximum number of motion vector candidates for the square partition.

In this way, encoder 100 and decoder 200 are capable of selecting an appropriate motion vector from among a large number of motion vector candidates for a partition having a complicated shape. On the other hand, encoder 100 and decoder 200 are capable of simplifying processing by using a motion vector candidate list having a small maximum list size for a partition having a simple shape. In this way, encoder 100 and decoder 200 are capable of contributing to reduction in code amount of the index indicating the motion vector.

In addition, for example, a rectangular (non-square) partition is assumed to have different characteristics between the long side and the short side. Accordingly it is assumed to be effective that a comparatively large number of motion vector candidates is derived from a plurality of neighboring partitions, and that a motion vector is selected from the comparatively large number of motion vector candidates. On the other hand, a square partition is assumed not to have characteristics similar to the rectangular (non-square) partition. Thus, it is assumed to be effective that processing is simplified.

However, there is a possibility that no appropriate motion vector is included in the large number of motion vector candidates for a complicated partition. Accordingly, it may be effective to reduce the code amount of the index indicating the motion vector by using the motion vector candidate list having a small maximum list size for the complicated partition. Accordingly, the maximum number of motion vector candidates for a rectangular (non-square) partition is not limited to the example in FIG. 18, and may be smaller than the maximum number of motion vectors for a square partition.

In this aspect, the maximum numbers of motion vector candidates for the motion vectors are adaptively determined based on the partition shapes. In this way, it is possible to increase the coding efficiency and optimize the computation amount. In addition, it is possible to increase the image quality through the appropriate prediction processing.

It is to be noted that encoder 100 and decoder 200 perform inter prediction in the same manner. In addition, at least part of this aspect may be combined with at least part of other one or more aspects. In addition, any of the processes, elements, syntaxes, features, and an optional combination of these according to this aspect may be applied to any of the aspects.

All the above-described processes do not always need to be included in a method, and all the elements do not always need to be included in a device. In other words, part of the plurality of processes described above do not always need to be included in the method, and part of the plurality of elements described above do not always need to be included in the device.

[Third Aspect of Inter Prediction]

In this embodiment, the order of motion vector candidates in a motion vector candidate list, that is, the order of candidates in the motion vector candidate list is dependent adaptively on a partition size. A plurality of motion vector candidates may be derived in an initial order, and may be re-arranged based on a partition size.

A merge index parameter for selecting a motion vector from the motion vector candidate list is encoded into a bitstream in encoder 100, and the encoded merge index parameter is decoded from the bitstream in decoder 200. At that time, the merge index parameter is encoded using arithmetic encoding and is decoded using arithmetic decoding.

The code size of the merge index parameter is dependent on the position of the motion vector candidate indicating the merge index parameter in the order of candidates in the motion vector candidate list. The merge index parameter indicating a motion vector candidate arranged before another motion vector candidate in the order of candidates in the motion vector candidate list is encoded and decoded using a small number of bits compared with the case of the merge index parameter indicating the other motion vector candidate arranged after.

Figure 19:
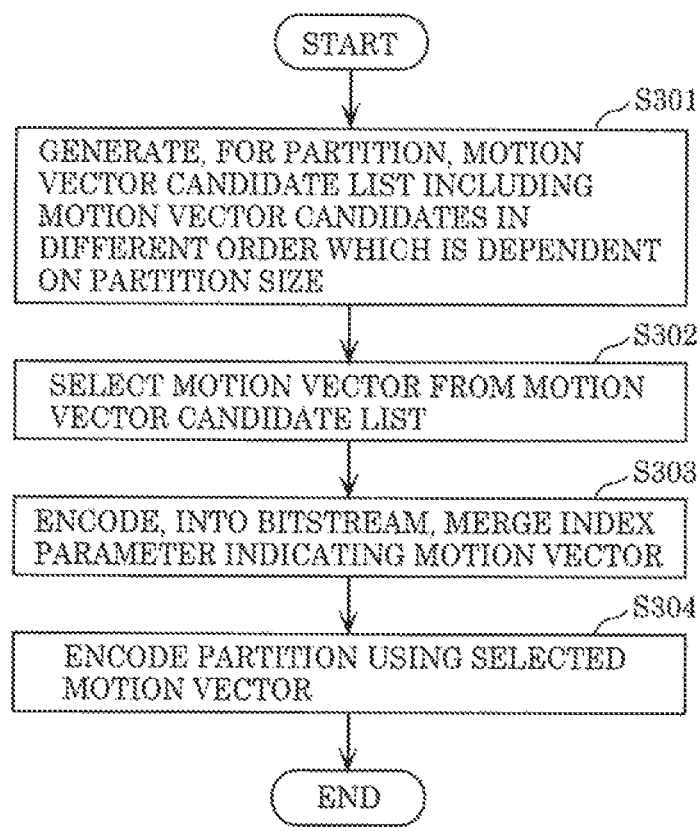
FIG. 19 is a flow chart indicating a third aspect of inter prediction performed by the encoder according to Embodiment 1.

FIG. 19 is a flow chart indicating the third aspect of inter prediction performed by encoder 100 illustrated in FIG. 1.

First, inter predictor 126 in encoder 100 generates, for a partition, a motion vector candidate list including a plurality of motion vector candidates in order which is dependent on the partition size (S301). For example, inter predictor 126 may generate, for a large partition, a motion vector candidate list including a plurality of motion vector candidates in order different from the order in the case of a small partition.

Next, inter predictor 126 then selects a motion vector for the current partition from the motion vector candidate list (S302).

Next, entropy encoder 110 of encoder 100 encodes, into a bitstream, a merge index parameter indicating the motion vector for the current partition among the plurality of motion vector candidates in the motion vector candidate list (S303). For example, entropy encoder 110 binarizes the merge index parameter into a plurality of bits, and encodes the plurality of bits using arithmetic encoding.

Lastly, encoder 100 encodes the current partition using the selected motion vector (S304).

Specifically, inter predictor 126 generates a predicted image of the current partition using the selected motion vector. Subtractor 104 derives a difference image between the original image and the predicted image of the current partition. Transformer 106 transforms the difference image into a plurality of transform coefficients. Quantizer 108 quantizes the plurality of transform coefficients. Entropy encoder 110 then encodes the quantized plurality of transform coefficients into a bitstream.

Figure 20:
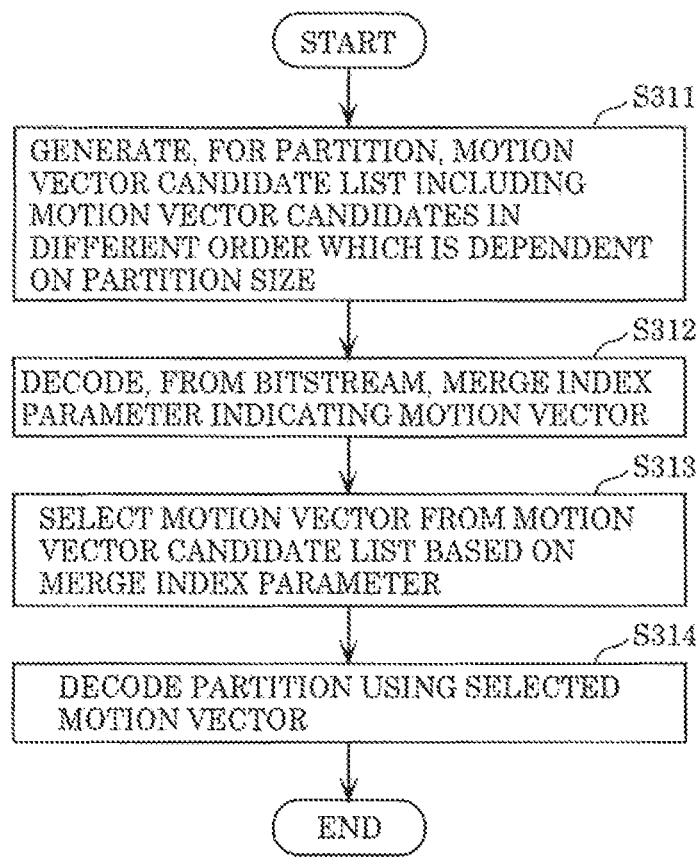
FIG. 20 is a flow chart indicating the third aspect of inter prediction performed by the decoder according to Embodiment 1.

FIG. 20 is a flow chart indicating the third aspect of inter prediction performed by decoder 200 illustrated in FIG. 10.

First, inter predictor 218 in decoder 200 generates, for a partition, a motion vector candidate list including a plurality of motion vector candidates in order which is dependent on the partition size (S311). For example, inter predictor 218 may generate, for a large partition, a motion vector candidate list including a plurality of motion vector candidates in order which is different from the order in the case of a small partition.

Next, entropy decoder 202 in decoder 200 decodes, from a bitstream, a merge index parameter indicating the motion vector for the current partition among the plurality of motion vector candidates in the motion vector candidate list (S312). For example, entropy decoder 202 decodes the merge index parameter using arithmetic decoding.

Inter predictor 218 then selects a motion vector for the current partition from the motion vector candidate list based on the merge index parameter (S313).

Lastly, decoder 200 decodes the current partition using the selected motion vector (S314).

Specifically, inter predictor 218 generates a predicted image of the current partition using the selected motion vector. Entropy decoder 202 decodes, from the bitstream, the quantized plurality of transform coefficients. Inverse quantizer 204 inverse quantizes the quantized plurality of transform coefficients. Inverse transformer 206 transforms the plurality of transform coefficients into a difference image. Adder 208 adds the difference image and the predicted image to reconstruct an image.

As described above, the motion vector candidate list generated for each partition includes the plurality of motion vector candidates for the motion vector for the partition. The orders of candidates vary between the two motion vector candidate lists generated respectively for the two partitions having different partition sizes.

Figure 21:
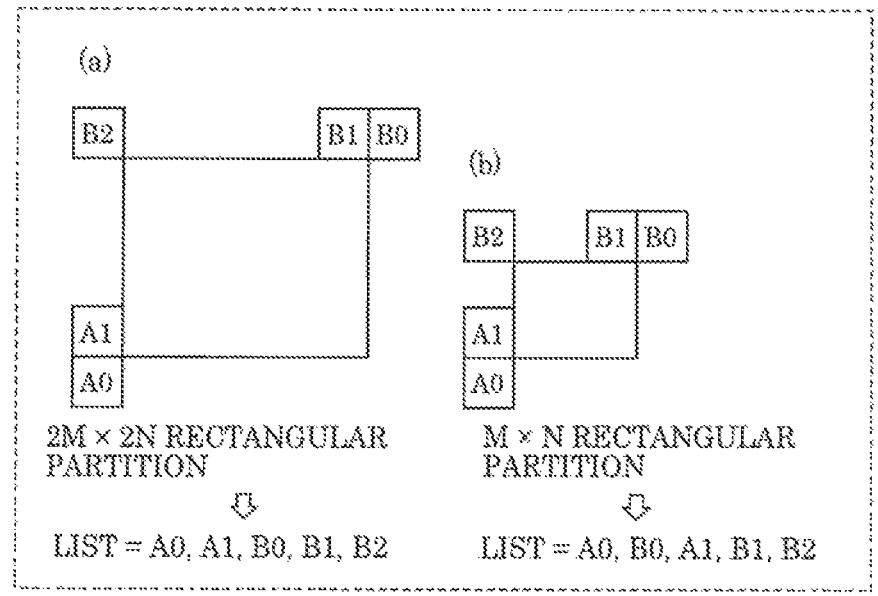
FIG. 21 is a conceptual diagram illustrating examples of maximum numbers of motion vector candidates which are dependent on partition sizes according to Embodiment 1.

FIG. 21 illustrates examples of the orders of candidates relating to partition sizes. In these examples, the orders of candidates vary between a large partition and a small partition.

Figure 22:
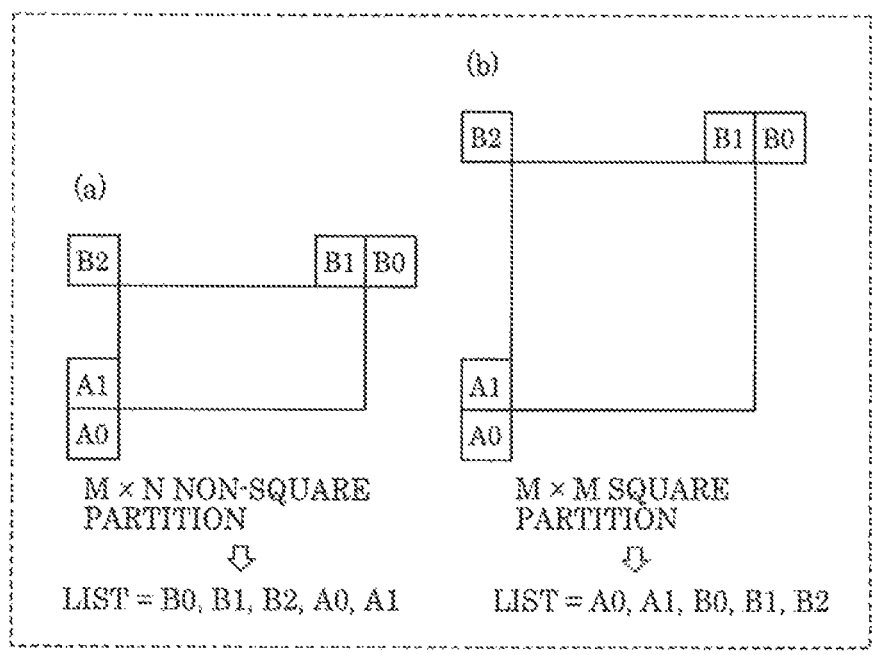
FIG. 22 is a conceptual diagram illustrating examples of maximum numbers of motion vector candidates which are dependent on partition sizes according to Embodiment 1.

FIG. 22 illustrates other examples of the orders of candidates relating to partition sizes. In these examples, the order of candidates vary between an M×M/2 block and an M×M square block.

In this aspect, the orders of motion vector candidates for the motion vectors are adaptively determined based on the partition sizes. In this way, it is possible to increase the coding efficiency.

It is to be noted that encoder 100 and decoder 200 perform inter prediction in the same manner. In addition, at least part of this aspect may be combined with at least part of other one or more aspects. In addition, any of the processes, elements, syntaxes, features, and an optional combination of these according to this aspect may be applied to any of the aspects.

All the above-described processes do not always need to be included in a method, and all the elements do not always need to be included in a device. In other words, part of the plurality of processes described above do not always need to be included in the method, and part of the plurality of elements described above do not always need to be included in the device.

[Fourth Aspect of Inter Prediction]

In this embodiment, the order of motion vector candidates in a motion vector candidate list, that is, the order of candidates in the motion vector candidate list is dependent adaptively on a partition shape. A plurality of motion vector candidates may be derived in an initial order, and may be re-arranged based on a partition shape.

A merge index parameter for selecting a motion vector from the motion vector candidate list is encoded into a bitstream in encoder 100, and the encoded merge index parameter is decoded from the bitstream in decoder 200. At that time, the merge index parameter is encoded using arithmetic encoding and is decoded using arithmetic decoding.

The code size of the merge index parameter is dependent on the position of the motion vector candidate indicating the merge index parameter in the order of candidates in the motion vector candidate list. The merge index parameter indicating a motion vector candidate arranged before another motion vector candidate in the order of candidates in the motion vector candidate list is encoded and decoded using a small number of bits compared with the case of the other merge index parameter indicating the other motion vector candidate arranged after.

Figure 23:
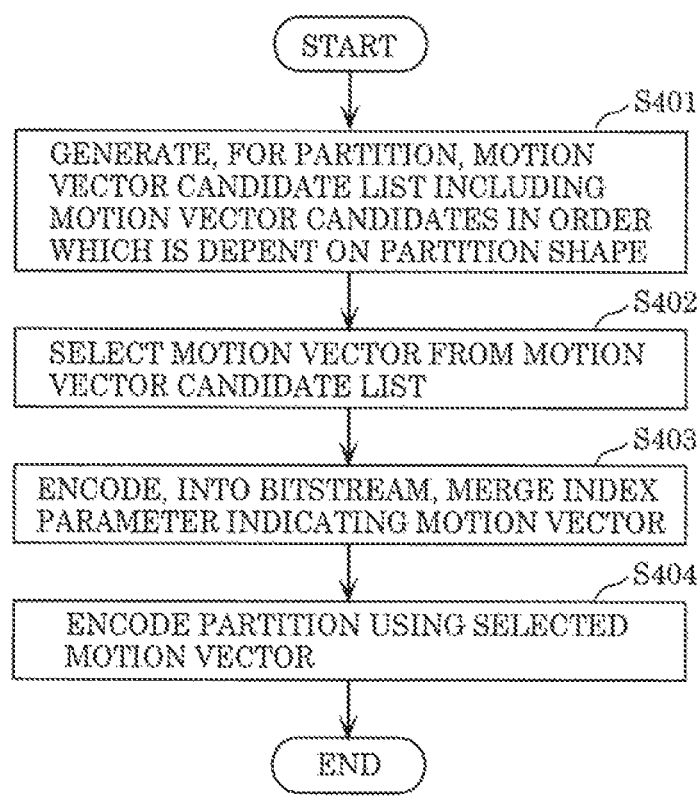
FIG. 23 is a flow chart indicating a fourth aspect of inter prediction performed by the encoder according to Embodiment 1.

FIG. 23 is a flow chart indicating the fourth aspect of inter prediction performed by encoder 100 illustrated in FIG. 1.

First, inter predictor 126 in encoder 100 generates, for a partition, a motion vector candidate list including a plurality of motion vector candidates in order which is dependent on the partition shape (S401). For example, inter predictor 126 may generate, for a non-rectangular (triangular) partition, a motion vector candidate list including a plurality of motion vector candidates in order which is different from the order in the case of a rectangular partition.

Next, inter predictor 126 then selects a motion vector for the current partition from the motion vector candidate list (S402).

Next, entropy encoder 110 of encoder 100 encodes, into a bitstream, a merge index parameter indicating the motion vector for the current partition among the plurality of motion vector candidates in the motion vector candidate list (S403). For example, entropy encoder 110 binarizes the merge index parameter into a plurality of bits, and encodes the plurality of bits using arithmetic encoding.

Lastly, encoder 100 encodes the current partition using the selected motion vector (S404).

Specifically, inter predictor 126 generates a predicted image of the current partition using the selected motion vector. Subtractor 104 derives a difference image between the original image and the predicted image of the current partition. Transformer 106 transforms the difference image into a plurality of transform coefficients. Quantizer 108 quantizes the plurality of transform coefficients. Entropy encoder 110 then encodes the quantized plurality of transform coefficients into a bitstream.

Figure 24:
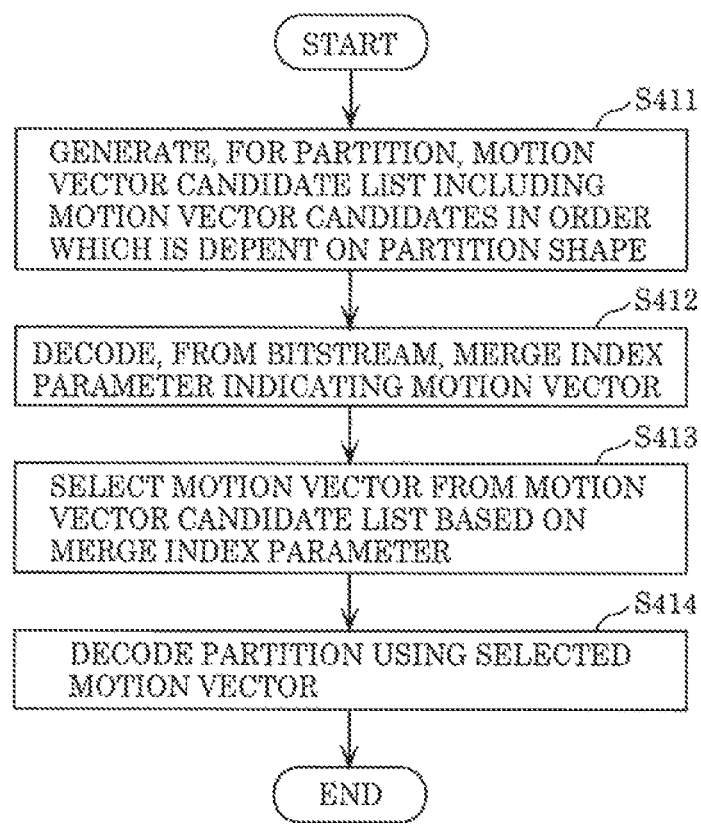
FIG. 24 is a flow chart indicating the fourth aspect of inter prediction performed by the decoder according to Embodiment 1.

FIG. 24 is a flow chart indicating the fourth aspect of inter prediction performed by decoder 200 illustrated in FIG. 10.

First, inter predictor 218 in decoder 200 generates, for a current partition to be decoded, a motion vector candidate list including a plurality of motion vector candidates in order which is dependent on the partition shape (S411). For example, inter predictor 218 may generate, for a non-rectangular (triangular) partition, a motion vector candidate list including a plurality of motion vector candidates in order which is different from the order in the case of a rectangular partition.

Next, entropy decoder 202 in decoder 200 decodes, from a bitstream, a merge index parameter indicating the motion vector for the current partition among the plurality of motion vector candidates in the motion vector candidate list (S412). For example, entropy decoder 202 decodes the merge index parameter using arithmetic decoding.

Inter predictor 218 then selects a motion vector for the current partition from the motion vector candidate list based on the merge index parameter (S413).

Lastly, decoder 200 decodes the current partition using the selected motion vector (S414).

Specifically, inter predictor 218 generates a predicted image of the current partition using the selected motion vector. Entropy decoder 202 decodes, from the bitstream, the quantized plurality of transform coefficients. Inverse quantizer 204 inverse quantizes the quantized plurality of transform coefficients. Inverse transformer 206 transforms the plurality of transform coefficients into a difference image. Adder 208 adds the difference image and the predicted image to reconstruct an image.

As described above, the motion vector candidate list generated for each partition includes the plurality of motion vector candidates for the motion vector for the partition. The orders of candidates vary between the two motion vector candidate lists generated respectively for the two partitions having different partition shapes.

Figure 25:
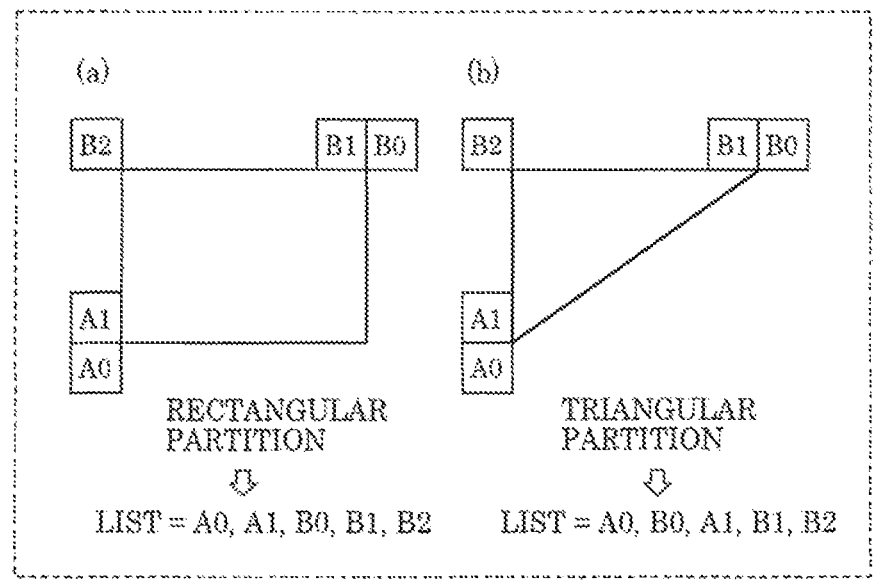
FIG. 25 is a conceptual diagram illustrating example orders of candidates which are dependent on partition sizes according to Embodiment 1.

FIG. 25 illustrates examples of the orders of candidates relating to partition shapes. In these examples, the orders of candidates vary between a rectangular partition and a triangular partition.

Figure 26:
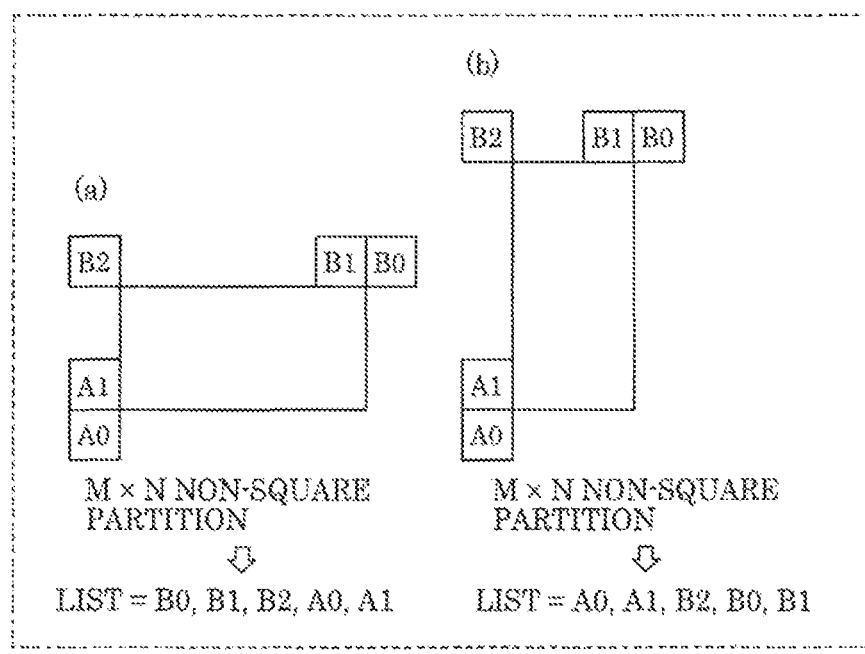
FIG. 26 is a conceptual diagram illustrating example orders of candidates which are dependent on partition shapes according to Embodiment 1.

FIG. 26 illustrates other examples of the orders of candidates relating to partition shapes. In these examples, the orders of candidates vary between an M×N block and an N×M block. These two partitions may have the same shape and different orientations. When the orientations of the partitions having the same shape are different, the orders of candidates may vary. In other words, the orders of candidates may be dependent on the orientations of partition shapes. In other words, the orders of candidates may be dependent on the partition shapes which have an orientation as an attribute.

It is to be noted that FIG. 26 illustrates an example, and the orders of candidates may not be dependent on the orientations of partition shapes. In other words, the orders of candidates may be dependent on the partition shapes which do not have orientations as attributes. For example, these two partitions may have different partition shapes or have the same order of candidates when the partition shapes are the same.

In this aspect, the orders of motion vector candidates for the motion vectors are adaptively determined based on the partition shapes. In this way, it is possible to increase the coding efficiency.

It is to be noted that encoder 100 and decoder 200 perform inter prediction in the same manner. In addition, at least part of this aspect may be combined with at least part of other one or more aspects. In addition, any of the processes, elements, syntaxes, features, and an optional combination of these according to this aspect may be applied to any of the aspects.

All the above-described processes do not always need to be included in a method, and all the elements do not always need to be included in a device. In other words, part of the plurality of processes described above do not always need to be included in the method, and part of the plurality of elements described above do not always need to be included in the device.

[Mounting Example]

Figure 27:
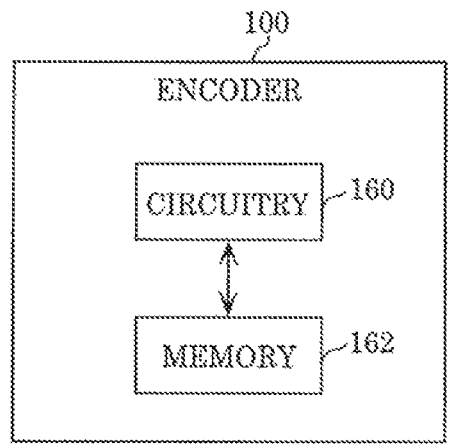
FIG. 27 is a block diagram illustrating an example of mounting the encoder according to Embodiment 1.

FIG. 27 is a block diagram illustrating an example of mounting encoder 100. Encoder 100 includes circuitry 160 and memory 162. For example, a plurality of constituent elements of encoder 100 illustrated in FIG. 1 are mounted on processor 160 and memory 162 illustrated in FIG. 27.

Circuitry 160 is an electronic circuit accessible to memory 162, and performs information processing. For example, circuitry 160 is a dedicated or general-purpose electronic circuitry which encodes videos using memory 162. Circuitry 160 may be a processor such as a CPU. Circuitry 160 may be a combination of a plurality of electronic circuits.

In addition, for example, circuitry 160 may take the roles of constituent elements other than the constituent elements for storing information among the plurality of constituent elements of encoder 100 illustrated in FIG. 1. In other words, circuitry 160 may perform the above-described operations by these constituent elements.

Memory 162 is general-purpose or dedicated memory in which information for allowing circuitry 160 to encode a video is stored. Memory 162 may be electronic circuitry, may be connected to circuitry 160, and may be included in circuitry 160.

Memory 162 may be a combination of a plurality of electronic circuits, or may be configured with a plurality of sub-memories. Memory 162 may be a magnetic disc, an optical disc, or the like, or may be represented as storage, a recording medium, or the like. Memory 162 may be non-volatile memory or volatile memory.

For example, memory 162 may take the roles of constituent elements for storing information among the plurality of constituent elements of encoder 100 illustrated in FIG. 1. Specifically, memory 162 may take the roles of block memory 118 and frame memory 122 illustrated in FIG. 1.

For example, a video to be encoded or a bitstream corresponding to the encoded video may be recorded onto memory 162. Memory 162 may include a program for causing circuitry 160 to encode a video recorded thereon.

In encoder 100, it is not always necessary that all the constituent elements illustrated in FIG. 1 be mounted, and that all the above-described processes be performed. Part of the constituent elements illustrated in FIG. 1 may be included in another device, and part of the above-described processes may be executed by another device. In addition, in encoder 100, by means of the part of the plurality of constituent elements illustrated in FIG. 1 being mounted and the part of the processes described above being performed, information for prediction can be configured appropriately.

Figure 28:
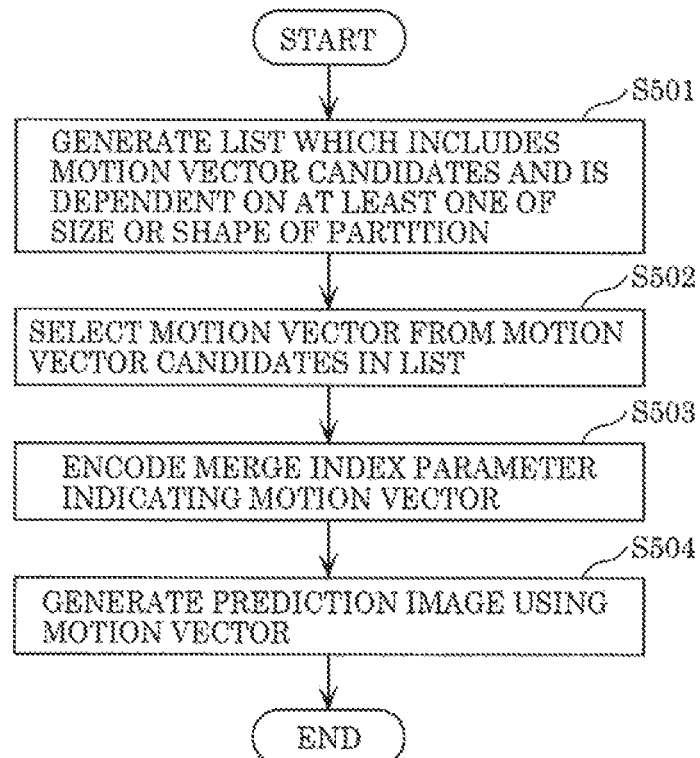
FIG. 28 is a flow chart indicating an example of an operation performed by the encoder according to Embodiment 1.

FIG. 28 is a flow chart indicating an example of an operation performed by encoder 100 illustrated in FIG. 27. For example, when encoder 100 encodes a video into a bitstream using a predicted image, circuitry 160 in encoder 100 performs the operation indicated in FIG. 28 using memory 162.

First, circuitry 160 generates a list including a plurality of candidates for a first motion vector for a first partition in a video (S501). The plurality of candidates included in this list includes a candidate derived from a second motion vector for a second partition different from the first partition in the video. In addition, at least one of the maximum list size of the list or the order of the plurality of candidates included in the list is dependent on at least one of the partition size or the partition shape of the first partition.

Next, circuitry 160 selects a motion vector from the plurality of candidates included in the list (S502). In addition, circuitry 160 encodes, into a bitstream, an index indicating the first motion vector among the plurality of candidates included in the list based on the maximum list size (S503). Circuitry 160 then generates a predicted image of the first partition using the first motion vector (S504).

In this way encoder 100 is capable of generating the motion vector candidate list based on the maximum list size or the order of candidates which is dependent on the partition size or the partition shape. Accordingly, encoder 100 is capable of generating an appropriate candidate list based on the partition size or the partition shape. In other words, encoder 100 is capable of appropriately configuring information for prediction. Accordingly, encoder 100 is capable of contributing to reduction in code amount.

For example, when the partition size is a first partition size, the maximum list size may be the first list size. When the partition size is a second partition size smaller than the first partition size, the maximum list size may be a second list size larger than the first list size.

In this way, encoder 100 is capable of selecting an appropriate motion vector from among a large number of motion vector candidates for a small partition. On the other hand, there is a possibility that no appropriate motion vector is included in the large number of motion vector candidates for the large partition. Accordingly, encoder 100 is capable of contributing to reduction in code amount of the index indicating the motion vector by using a motion vector candidate list having a small maximum list size for the large partition.

For example, when the partition size is a first partition size, the maximum list size may be the first list size. When the partition size is a second partition size smaller than the first partition size, the maximum list size may be a second list size smaller than the first list size.

In this way, encoder 100 is capable of selecting the appropriate motion vector from among the large number of motion vector candidates for the large partition. Accordingly, encoder 100 is capable of simplifying the processing and contributing to reduction in code amount of the index indicating the motion vector by using the motion vector candidate list having the small maximum list size for the large partition.

In addition, for example, the maximum list size may be dependent on the partition shape which is one of a square, a rectangle, or a triangle. In this way, encoder 100 is capable of generating an appropriate candidate list based on the partition shape which is one of a square, a rectangle, or a triangle.

In addition, for example, when the partition shape is a triangle, the maximum list size may be the first list size. When the partition shape is not a triangle, the maximum list size may be a second list size larger than the first list size.

In this way, encoder 100 is capable of selecting an appropriate motion vector from among a large number of motion vector candidates for a rectangular partition. On the other hand, there is a possibility that the number of referable processed partitions is small and the number of derivable motion vector candidates is small around the triangular partition. Accordingly, encoder 100 is capable of contributing to reduction in code amount of the index indicating the motion vector by using a motion vector candidate list having a small maximum list size for the triangular partition.

In addition, for example, when the partition shape is a square, the maximum list size may be the first list size. When the partition shape is not a square, the maximum list size may be a second list size larger than the first list size.

In this way, encoder 100 is capable of selecting an appropriate motion vector from among a large number of motion vector candidates for a partition having a complicated shape. Accordingly, encoder 100 is capable of simplifying processing and contributing to reduction in code amount of an index indicating a motion vector by using a motion vector candidate list having a small maximum list size for a partition having a simple shape.

In addition, for example, when the maximum list size is the first list size, circuitry 160 may encode an index using a first number of bits. When the maximum list size is a second list size larger than the first list size, circuitry 160 may then encode an index using a second number of bits larger than the first number of bits. In this way, encoder 100 is capable of encoding the index using an appropriate number of bits based on the maximum list size.

In addition, for example, the second partition may be a partition that neighbors the first partition.

In this way, encoder 100 is capable of deriving a candidate for the motion vector for the current partition from a motion vector of a partition that neighbors the current partition. Accordingly, encoder 100 is capable of appropriately deriving the candidate for the motion vector for the current partition from the motion vector that is assumed to be similar to the motion vector for the current partition.

Figure 29:
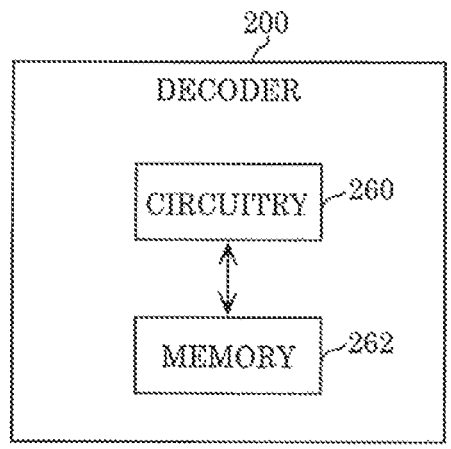
FIG. 29 is a block diagram illustrating an example of mounting the decoder according to Embodiment 1.

FIG. 29 is a block diagram illustrating an example of mounting decoder 200. Decoder 200 includes circuitry 260 and memory 262. For example, a plurality of constituent elements of decoder 200 illustrated in FIG. 10 are mounted on circuitry 260 and memory 262 illustrated in FIG. 29.

Circuitry 260 is an electronic circuit accessible to memory 262, and performs information processing. For example, circuitry 260 is a dedicated or general-purpose electronic circuitry which decodes videos using memory 262. Circuitry 260 may be a processor such as a CPU. Circuitry 260 may be a combination of a plurality of electronic circuits.

In addition, for example, circuitry 260 may take the roles of constituent elements other than the constituent elements for storing information among the plurality of constituent elements of decoder 200 illustrated in FIG. 10. In other words, circuitry 260 may perform the above-described operations by these constituent elements.

Memory 262 is general-purpose or dedicated memory in which information for allowing circuitry 260 to decode a video is stored. Memory 262 may be electronic circuitry, may be connected to circuitry 260, and may be included in circuitry 260.

Memory 262 may be a combination of a plurality of electronic circuits, or may be configured with a plurality of sub-memories. Memory 262 may be a magnetic disc, an optical disc, or the like, or may be represented as storage, a recording medium, or the like. Memory 262 may be non-volatile memory or volatile memory.

For example, memory 262 may take the roles of constituent elements for storing information among the plurality of constituent elements of decoder 200 illustrated in FIG. 10. Specifically, memory 262 may takes the roles of block memory 210 and frame memory 214 illustrated in FIG. 10.

For example, a bitstream corresponding to an encoded video or a decoded video may be recorded onto memory 262. Memory 262 may include a program for causing circuitry 260 to decode a video recorded thereon.

In decoder 200, it is not always necessary that all the constituent elements illustrated in FIG. 10 be mounted, and that all the above-described processes be performed. Part of the constituent elements illustrated in FIG. 10 may be included in another device, and part of the above-described processes may be executed by another device. In addition, in decoder 200, by means of the part of the plurality of constituent elements illustrated in FIG. 10 being mounted and the part of the processes described above being performed, information for prediction can be configured appropriately.

Figure 30:
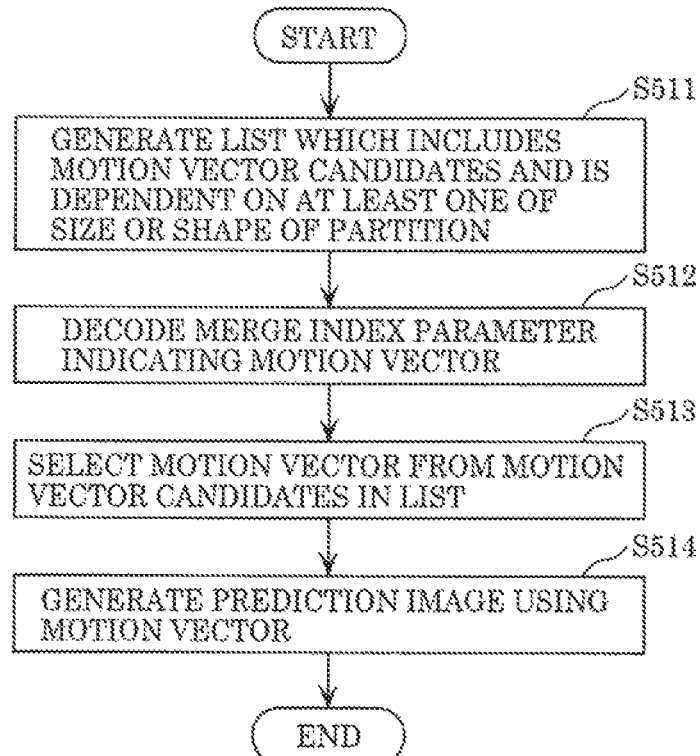
FIG. 30 is a flow chart indicating an example of an operation performed by the decoder according to Embodiment 1.

FIG. 30 is a flow chart indicating an example of an operation performed by decoder 200 illustrated in FIG. 29. For example, when decoder 200 decodes, from a bitstream, a video using a predicted image, circuitry 260 in decoder 200 performs the operation indicated in FIG. 30 using memory 262.

First, circuitry 260 generates a list including a plurality of candidates for a first motion vector for a first partition in a video (S511). The plurality of candidates included in this list includes candidates derived from a second motion vector for a second partition different from the first partition in the video. In addition, at least one of the maximum list size of the list or the order of the plurality of candidates included in the list is dependent on at least one of the partition size and the partition shape of the first partition.

In addition, circuitry 260 decodes, from a bitstream, an index indicating the first motion vector among the plurality of candidates included in the list based on the maximum list size (S512). Next, circuitry 260 selects a first motion vector from the plurality of candidates included in the list using the index (S513). Circuitry 260 then generates a predicted image of the first partition using the first motion vector (S14).

In this way decoder 200 is capable of generating a motion vector candidate list based on the maximum list size or the order of candidates which is dependent on the partition size or the partition shape. Accordingly, decoder 200 is capable of generating an appropriate candidate list based on the partition size or the partition shape. In other words, decoder 200 is capable of appropriately configuring information for prediction. Accordingly, decoder 200 is capable of contributing to reduction in code amount.

For example, when the partition size is a first partition size, the maximum list size may be a first list size. When the partition size is a second partition size smaller than the first partition size, the maximum list size may be a second list size larger than the first list size.

In this way, decoder 200 is capable of selecting an appropriate motion vector from among the large number of motion vector candidates for the small partition. On the other hand, there is a possibility that no appropriate motion vector is included in the large number of motion vector candidates for the large partition. Accordingly, decoder 200 is capable of contributing to the reduction in code amount of the index indicating the motion vector by using the motion vector candidate list having the small maximum list size for the large partition.

For example, when the partition size is a first partition size, the maximum list size may be the first list size. When the partition size is a second partition size smaller than the first partition size, the maximum list size may be a second list size smaller than the first list size.

In this way, decoder 200 is capable of selecting an appropriate motion vector from among the large number of motion vector candidates for the large partition. Accordingly, decoder 200 is capable of simplifying the processing and contributing to reduction in code amount of the index indicating the motion vector by using the motion vector candidate list having the small maximum list size for the small partition.

In addition, for example, the maximum list size may be dependent on the partition shape which is one of a square, a rectangle, or a triangle. In this way, decoder 200 is capable of generating an appropriate candidate list based on the partition shape which is one of a square, a rectangle, or a triangle.

In addition, for example, when the partition shape is a triangle, the maximum list size may be a first list size. When the partition shape is not a triangle, the maximum list size may be a second list size larger than the first list size.

In this way, decoder 200 is capable of selecting an appropriate motion vector from among a large number of motion vector candidates for a rectangular partition. On the other hand, there is a possibility that the number of referable processed partitions is small and the number of derivable motion vector candidates is small around the triangular partition. Accordingly, decoder 200 is capable of contributing to reduction in code amount of the index indicating the motion vector by using the motion vector candidate list having the small maximum list size for the triangular partition.

In addition, for example, when the partition shape is a square, the maximum list size may be a first list size. When the partition shape is not a square, the maximum list size may be a second list size larger than the first list size.

In this way, decoder 200 is capable of selecting an appropriate motion vector from among a large number of motion vector candidates for a partition having a complicated shape. Accordingly, decoder 200 is capable of simplifying processing and contributing to reduction in code amount of an index indicating a motion vector by using a motion vector candidate list having a small maximum list size for a partition having a simple shape.

In addition, for example, when the maximum list size is the first list size, circuitry 260 may decode an index using a first number of bits. When the maximum list size is a second list size larger than a first list size, circuitry 260 may then decode the index using a second number of bits larger than the first number of bits. In this way, decoder 200 is capable of decoding the index using an appropriate number of bits based on the maximum list size.

In addition, for example, the second partition may be a partition that neighbors the first partition.

In this way, decoder 200 is capable of deriving a candidate for the motion vector for the current partition from a motion vector of a partition that neighbors the current partition. Accordingly, decoder 200 is capable of appropriately deriving the candidate for the motion vector for the current partition from the motion vector that is assumed to be similar to the motion vector for the current partition.

[Supplements]

Encoder 100 and decoder 200 according to the above-described embodiments may be used respectively as image encoder and an image decoder, or as a video encoder and a video decoder.

Alternatively, each of encoder 100 and decoder 200 may be used as a prediction device or an inter prediction device. In other words, each of encoder 100 and decoder 200 may correspond only to inter predictor 126 and inter predictor 218, respectively. The other constituent elements of entropy encoder 110, entropy decoder 202, etc. may be included in one or more other devices.

Alternatively, at least part of the embodiments may be used as an encoding method and/or a decoding method, as a prediction method, and/or as other methods.

In addition, in the above descriptions, the maximum list size or the order of candidates in the motion vector candidate list for the motion vector to encode the current partition are dependent on the partition size and the partition shape of the current partition.

However, the maximum list size or the order of candidates in the motion vector predictor candidate list for a motion vector predictor to encode the current partition may be dependent on the partition size or the partition shape of the current partition. In other words, the motion vector may be replaced by the motion vector predictor. For example, in this case, a motion vector difference which is a difference between the motion vector and the motion vector predictor is encoded and decoded.

In addition, in each of the above embodiments, each of the constituent elements may be implemented with a dedicated hardware configuration or implemented by executing a software program suitable for the constituent element. Each constituent element may be implemented by a program executer such as a CPU or a processor reading and executing a software program which is recorded on a recording medium such as a hard disc or a semiconductor memory.

Specifically, each of encoder 100 and decoder 200 may include processing circuitry and storage electrically connected to the processing circuitry and accessible from the processing circuitry. For example, the processing circuitry corresponds to circuitry 160 or 260, and the storage corresponds to memory 162 or 262.

The processing circuitry includes at least one of the dedicated hardware or the program executor, and executes the process using the storage. In addition, when the processing circuitry includes the program executor, the storage stores a software program that is executed by the program executor.

Here, the software which implements encoder 100, decoder 200, etc. according to each of the above-described embodiments is a program as indicated below.

For example, this program may cause a computer to execute an encoding method of encoding a video into a bitstream using a predicted image. The encoding method includes generating a list which includes a plurality of candidates for a first motion vector for a first partition in the video, and in which the plurality of candidates includes a candidate which is derived from a second motion vector of a second partition different from the first partition in the video. The list has a maximum list size and an order of the plurality of candidates, and at least one of the maximum list size or the order of the plurality of candidates is dependent on at least one of a partition size or a partition shape of the first partition. The encoding method includes: selecting the first motion vector from the plurality of candidates included in the list; encoding an index indicating the first motion vector among the plurality of candidates in the list into the bitstream based on the maximum list size; and generating the predicted image for the first partition using the first motion vector.

In addition, for example, this program may cause a computer to execute a decoding method of decoding a video from a bitstream using a predicted image. The decoding method includes generating a list which includes a plurality of candidates for a first motion vector for a first partition in the video, and in which the plurality of candidates includes a candidate which is derived from a second motion vector of a second partition different from the first partition in the video. The list having a maximum list size and an order of the plurality of candidates, and at least one of the maximum list size or the order of the plurality of candidates is dependent on at least one of a partition size or a partition shape of the first partition; decoding an index indicating the first motion vector among the plurality of candidates in the list from the bitstream based on the maximum list size. The decoding method includes selecting the first motion vector from the plurality of candidates in the list using the index, and generating the predicted image for the first partition using the first motion vector.

In addition, each constituent element may be circuitry as described above. Circuits may compose circuitry as a whole, or may be separate circuits. Alternatively, each constituent element may be implemented as a general processor, or may be implemented as a dedicated processor.

In addition, the process that is executed by a particular constituent element may be executed by another constituent element. In addition, the processing execution order may be modified, or a plurality of processes may be executed in parallel. In addition, an encoder and decoder may include encoder 100 and decoder 200.

The ordinal numbers such as "first" and "second" used in the description may be arbitrarily changed. In addition, ordinal numbers may be arbitrarily added to constituent elements, etc., or may be removed from constituent elements, etc.

Although aspects of encoder 100 and decoder 200 have been described based on the embodiments, aspects of encoder 100 and decoder 200 are not limited to the embodiments. The scope of the aspects of encoder 100 and decoder 200 may encompass embodiments obtainable by adding, to any of these embodiments, various kinds of modifications that a person skilled in the art would arrive at without deviating from the scope of the present disclosure and embodiments configurable by arbitrarily combining constituent elements in different embodiments.

This embodiment may be performed in combination with at least part of other aspects of the present disclosure. In addition, part of processing described in each of the flow charts, part of the configuration of each of the devices, part of each of syntaxes, etc. according to this embodiment may be combined with one or more other aspects.

Embodiment 2

As described in the above embodiment, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in the embodiment may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiment: various modifications may be made to the exemplary embodiments, the results of which are also included within the scope of the embodiments of the present disclosure.

Next, application examples of the moving picture encoding method (image encoding method) and the moving picture decoding method (image decoding method) described in the above embodiments and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

[Usage Examples]

Figure 31:
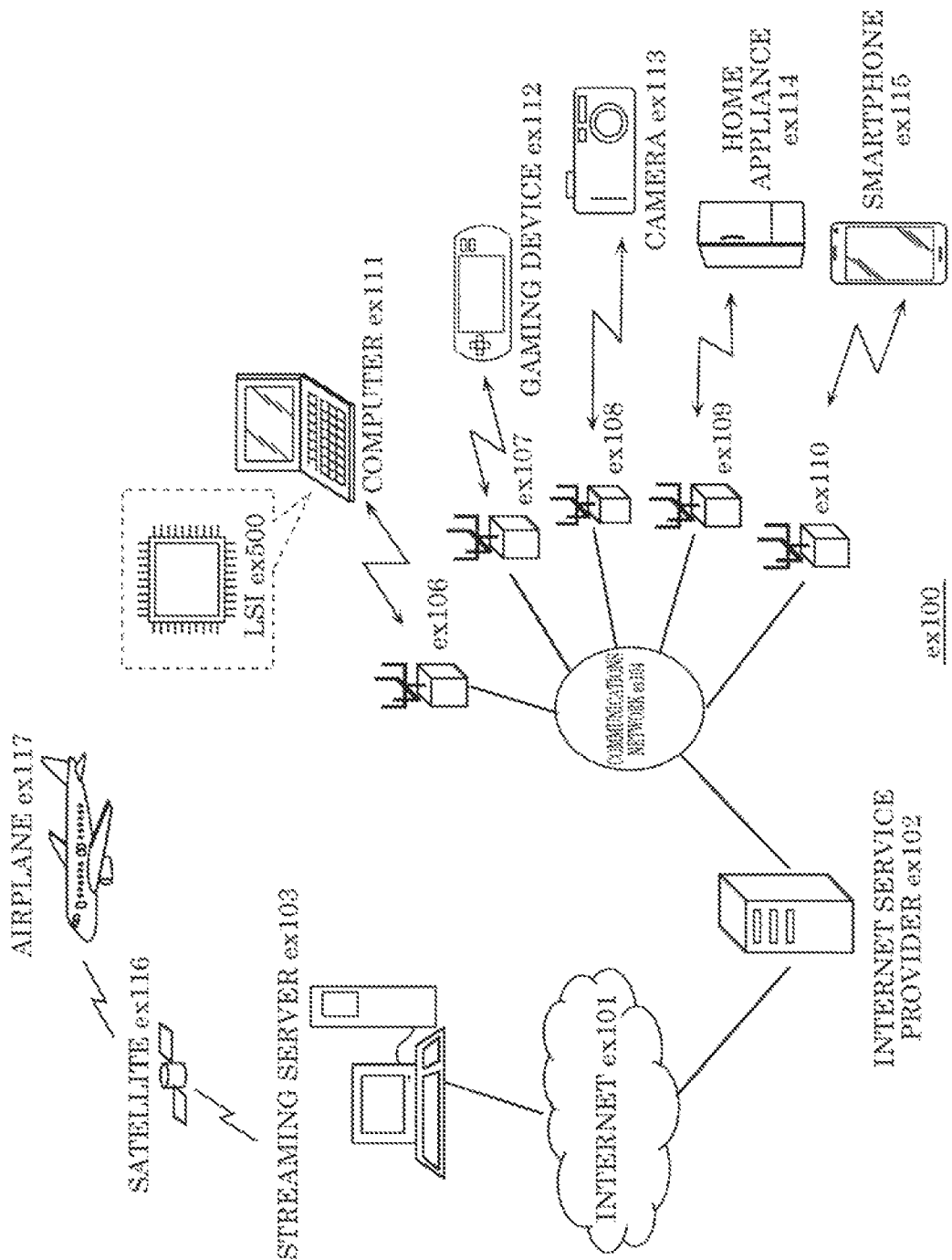
FIG. 31 illustrates an overall configuration of a content providing system for implementing a content distribution service.

FIG. 31 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiment on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an α value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 32:
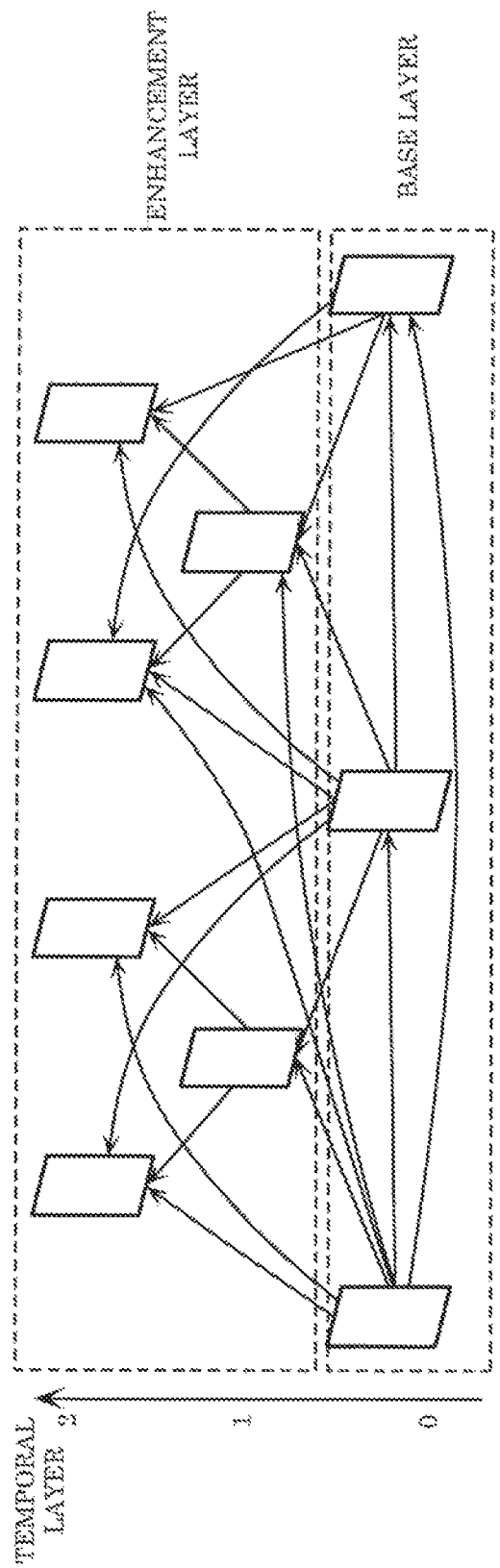
FIG. 32 illustrates one example of an encoding structure in scalable encoding.

The switching of content will be described with reference to a scalable stream, illustrated in FIG. 32, that is compression coded via implementation of the moving picture encoding method described in the above embodiment. The server may have a configuration in which content is switched while making use of the temporal and/or spatial scalability of a stream, which is achieved by division into and encoding of layers, as illustrated in FIG. 32. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 33:
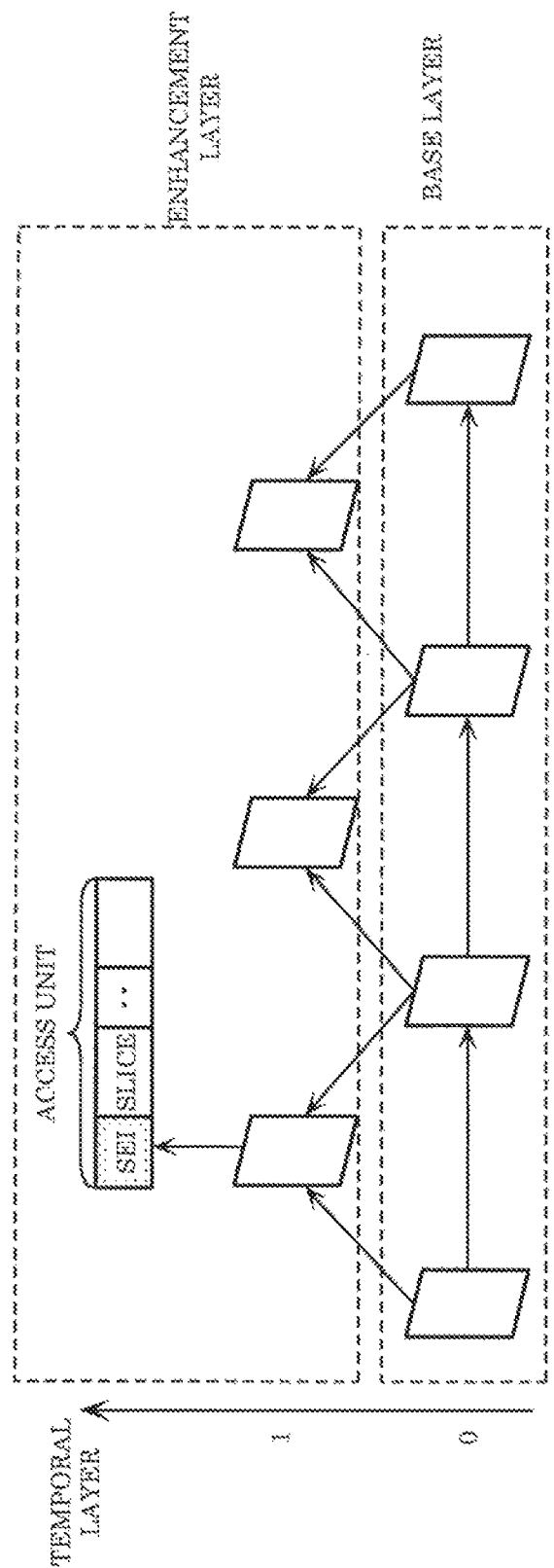
FIG. 33 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 33, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 34:
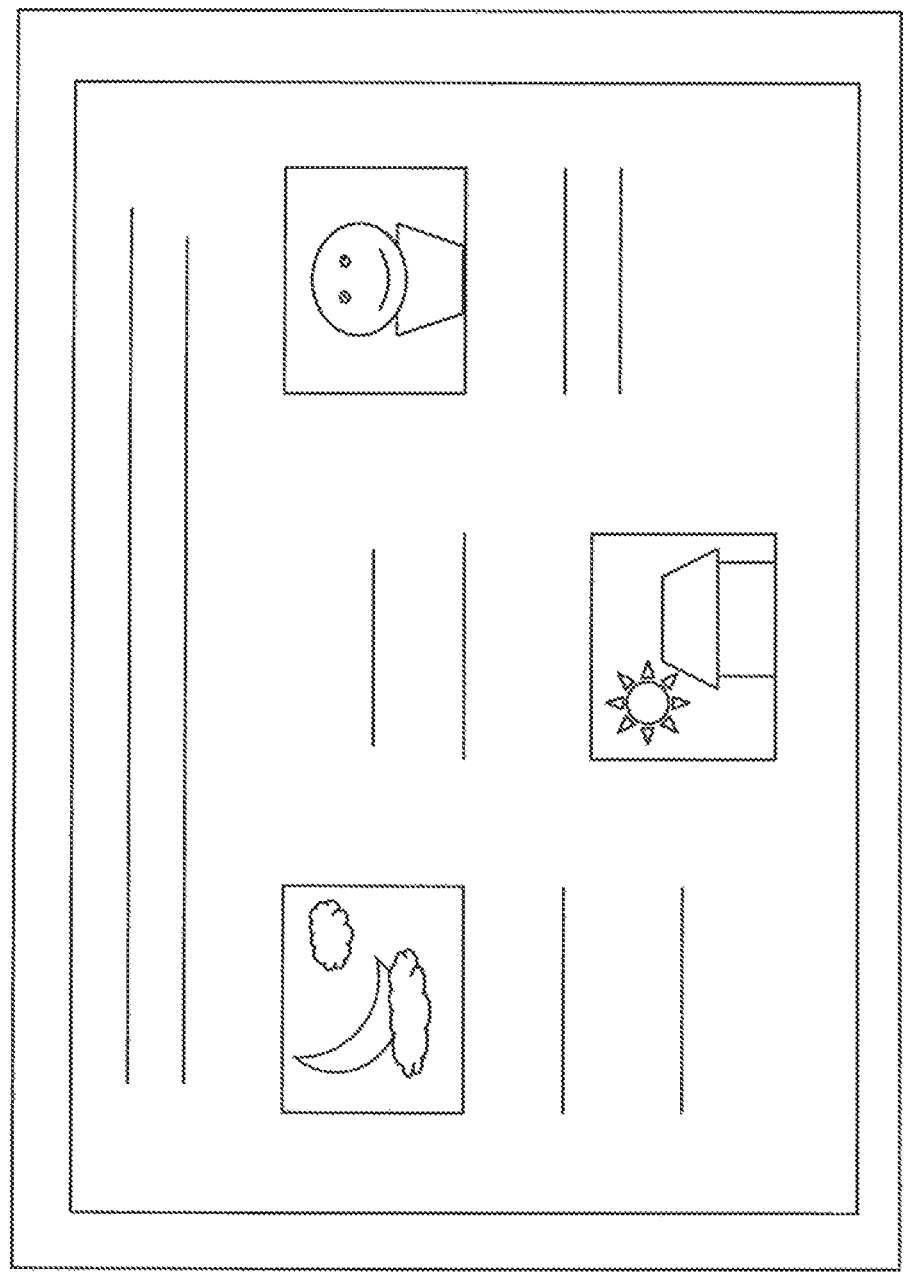
FIG. 34 illustrates an example of a display screen of a web page.
Figure 35:
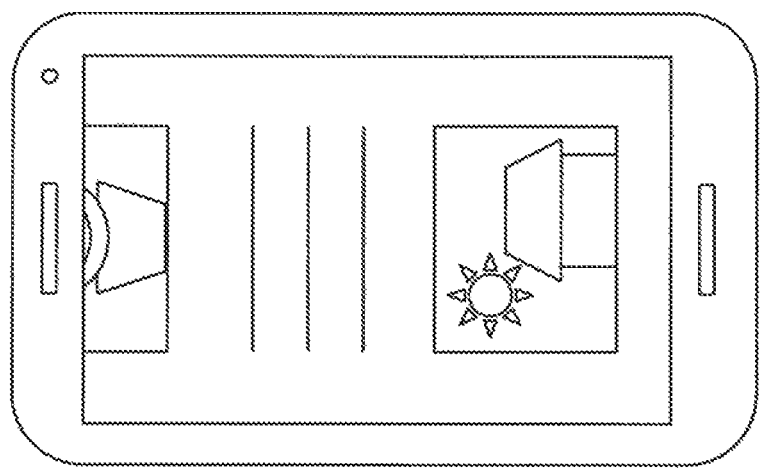
FIG. 35 illustrates an example of a display screen of a web page.

FIG. 34 illustrates an example of a display screen of a web page on, for example, computer ex111. FIG. 35 illustrates an example of a display screen of a web page on, for example, smartphone ex115. As illustrated in FIG. 34 and FIG. 35, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server-either when prompted or automatically-edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

[Other Usage Examples]

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiment may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 36:
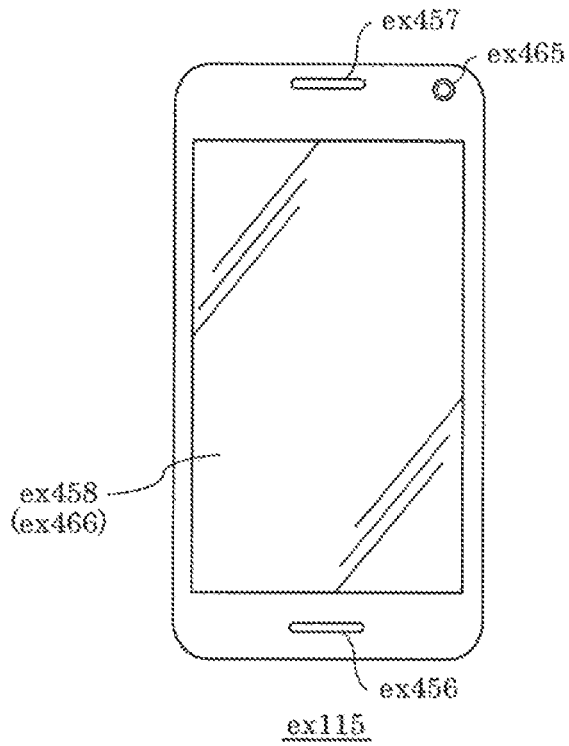
FIG. 36 illustrates one example of a smartphone.
Figure 37:
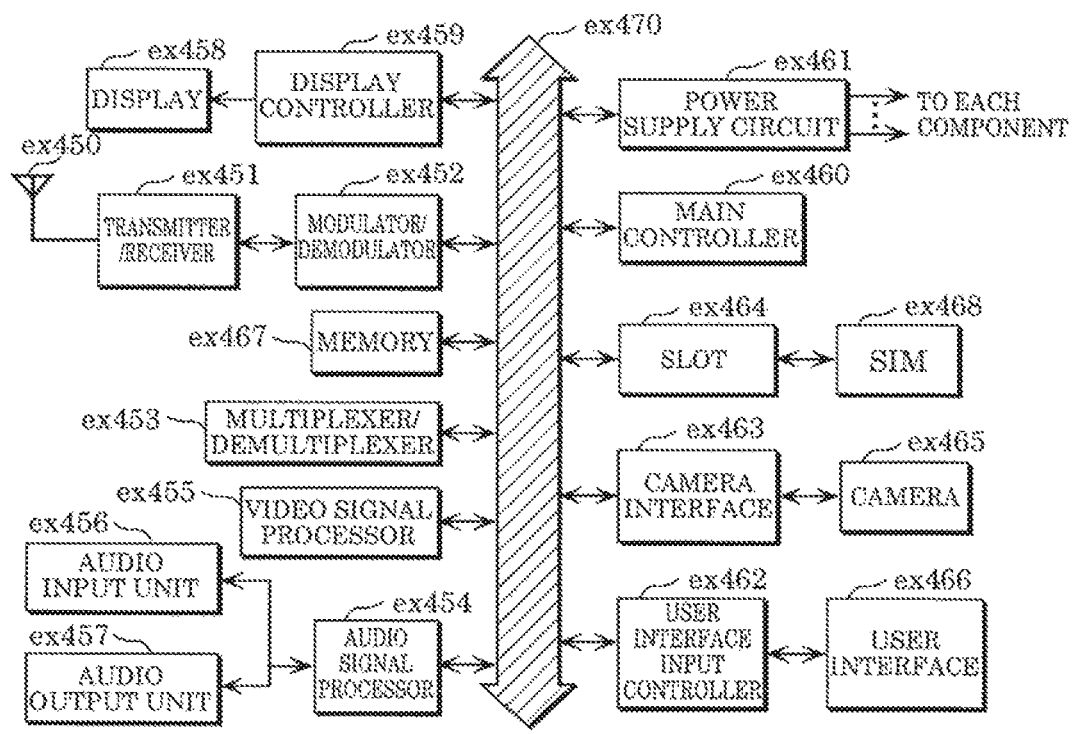
FIG. 37 is a block diagram illustrating a configuration example of a smartphone.

FIG. 36 illustrates smartphone ex115. FIG. 37 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of for example, user interface ex466 of the main body, and similar transmission and reception processing is performed. In data transmission mode, when sending a video, still image, or video and audio, video signal processor ex455 compression encodes, via the moving picture encoding method described in the above embodiment, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiment, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced. i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, television receivers, digital video recorders, car navigation systems, mobile phones, digital cameras, digital video cameras, teleconferencing systems, electronic mirrors, etc.

What is claimed is:

1. An encoder which encodes a video into a bitstream using a predicted image, the encoder comprising:
   circuitry; and
   memory,
   wherein, using the memory, the circuitry:
      derives a maximum number based on a partition shape of a first partition in the video, the maximum number being a first number when the partition shape is a square or a rectangle, and the maximum number being a second number different from the first number when the partition shape is a non-square and a non-rectangle;

generates a motion vector candidate list including a plurality of candidates equal to the derived maximum number, the plurality of candidates being for a first motion vector for the first partition, and the plurality of candidates including a candidate which is derived from a second motion vector of a second partition in the video different from the first partition;

selects the first motion vector from the plurality of candidates included in the motion vector candidate list;

encodes an index indicating the first motion vector among the plurality of candidates in the motion vector candidate list into the bitstream based on the maximum number; and generates the predicted image for the first partition using the first motion vector.

2. An encoding method of encoding a video into a bitstream using a predicted image, the encoding method comprising:

deriving a maximum number based on a partition shape of a first partition in the video, the maximum number being a first number when the partition shape is a square or a rectangle, and the maximum number being a second number different from the first number when the partition shape is a non-square and a non-rectangle;

generating a motion vector candidate list including a plurality of candidates equal to the derived maximum number, the plurality of candidates being for a first motion vector for the first partition, and the plurality of candidates including a candidate which is derived from a second motion vector of a second partition in the video different from the first partition;

selecting the first motion vector from the plurality of candidates included in the motion vector candidate list;

encoding an index indicating the first motion vector among the plurality of candidates in the motion vector candidate list into the bitstream based on the maximum number; and generating the predicted image for the first partition using the first motion vector.

* * * * *